US012584594B2

(12) United States Patent
Stalder et al.

(10) Patent No.: US 12,584,594 B2
(45) Date of Patent: Mar. 24, 2026

(54) VALVE FOR A GAS CARTRIDGE, GAS CARTRIDGE FOR A WATER CARBONATOR, AND METHOD FOR FILLING SUCH A GAS CARTRIDGE

(71) Applicant: SODAPOP GMbH, Bergisch Gladbach (DE)

(72) Inventors: Stefan Stalder, Zollikofen (CH); Günter Empl, Bergisch Gladbach (DE)

(73) Assignee: SODAPOP GmbH, Bergisch Gladbach (DE)

( * ) Notice: Subject to any disclaimer, the term of this patent is extended or adjusted under 35 U.S.C. 154(b) by 12 days.

(21) Appl. No.: 18/867,627

(22) PCT Filed: May 22, 2023

(86) PCT No.: PCT/EP2023/063653

§ 371 (c)(1),
(2) Date: Nov. 20, 2024

(87) PCT Pub. No.: WO2023/227531

PCT Pub. Date: Nov. 30, 2023

(65) Prior Publication Data

US 2025/0334232 A1 Oct. 30, 2025

(30) Foreign Application Priority Data

May 27, 2022 (DE) ...................... 10 2022 205 307.9
Jun. 22, 2022 (DE) ...................... 10 2022 206 227.2
Dec. 1, 2022 (DE) ...................... 10 2022 212 974.1

(51) Int. Cl.
*F17C 13/04* (2006.01)

(52) U.S. Cl.
CPC ........ *F17C 13/04* (2013.01); *F17C 2201/058* (2013.01); *F17C 2205/0329* (2013.01);
(Continued)

(58) Field of Classification Search
CPC .............. F17C 13/04; F17C 2205/0329; F17C 2205/0382; F17C 2205/0394;
(Continued)

(56) References Cited

U.S. PATENT DOCUMENTS 11,313,517 B1 * 4/2022 Danieli ................ B67D 1/0057
12,031,679 B2 * 7/2024 Hoefferer ................ F17C 13/04
(Continued)

FOREIGN PATENT DOCUMENTS

CN 109838690 A * 6/2019 .............. F17C 13/04
DE 29923282 U1 * 8/2000 .............. F17C 13/04
(Continued)

OTHER PUBLICATIONS

International Search Report and Written Opinion dated Sep. 29, 2023, for International Application PCT/EP2023/063653.

*Primary Examiner* — David Colon-Morales
(74) *Attorney, Agent, or Firm* — The Dobrusin Law Firm, P.C.

(57) ABSTRACT

A valve for selectively closing and selectively opening a gas cartridge for a water carbonator, the valve is configured to hold a gas in the gas cartridge when the valve is closed and to provide a fluidic connection when the valve is opened, the valve has a valve housing having a cartridge connector opening that is oriented along a longitudinal axis of the valve, so that the gas is able to flow into the gas cartridge and flow out of the gas cartridge in a direction of the longitudinal axis, the valve housing has at least one outlet opening arranged externally and arranged along a direction parallel to the longitudinal axis so that the gas is able to flow from the valve in the direction parallel to the longitudinal axis, and the at least one outlet opening is arranged spaced apart from the longitudinal axis.

15 Claims, 15 Drawing Sheets

(52) U.S. Cl.
CPC ................. *F17C 2205/0382* (2013.01); *F17C 2205/0394* (2013.01); *F17C 2221/013* (2013.01); *F17C 2223/0123* (2013.01); *F17C 2270/0736* (2013.01)

(58) Field of Classification Search
CPC ........ F17C 2205/0314; F17C 2201/058; F17C 2223/0123; F17C 2221/013; F17C 2270/0736
See application file for complete search history.

(56) References Cited

U.S. PATENT DOCUMENTS

| | | | | |
|---|---|---|---|---|
| 12,140,273 | B2 * | 11/2024 | Jahn | F17C 13/04 |
| 12,338,952 | B2 * | 6/2025 | Jahn | F17C 1/14 |
| 2021/0325001 | A1 * | 10/2021 | Leutwiler | F17C 13/04 |
| 2022/0033238 | A1 * | 2/2022 | Danieli | B67C 3/2614 |

FOREIGN PATENT DOCUMENTS

| | | | | | |
|---|---|---|---|---|---|
| DE | 20013847 | U1 | * | 12/2000 | F16K 1/303 |
| DE | 19927209 | B4 | * | 12/2005 | F16K 1/303 |
| DE | 202021101309 | U1 | * | 4/2021 | F17C 13/04 |
| DE | 102019217896 | A1 | * | 5/2021 | F17C 13/04 |
| DE | 202020005533 | U1 | * | 8/2021 | F17C 5/06 |
| DE | 202020005565 | U1 | * | 9/2021 | F17C 5/06 |
| EP | 1185810 | B1 | * | 9/2003 | F17C 13/04 |
| EP | 1185810 | A1 | | 3/2022 | |
| WO | WO-0194816 | A1 | * | 12/2001 | B67D 1/008 |
| WO | WO-2020230115 | A1 | * | 11/2020 | F17C 5/06 |

* cited by examiner

VALVE FOR A GAS CARTRIDGE, GAS CARTRIDGE FOR A WATER CARBONATOR, AND METHOD FOR FILLING SUCH A GAS CARTRIDGE

CROSS REFERENCE TO RELATED APPLICATIONS

This application is a US National Stage entry of PCT/EP2023/063653 filed on May 22, 2023, which claims priority to DE 10 2022 205 307.9 filed on May 27, 2022, DE 10 2022 206 227.2 filed on Jun. 22, 2022, and DE 10 2022 212 974.1 filed on Dec. 1, 2022, the entireties of which are all hereby incorporated by reference herein for all purposes.

FIELD

The present invention relates to a valve for selectively closing and selectively opening a gas cartridge for a water carbonator, wherein the valve is specified to hold a gas in the gas cartridge when it is closed and to provide a fluidic connection to the gas cartridge when it is opened, wherein the valve comprises a valve housing which has a cartridge connector opening that is aligned along a longitudinal axis of the valve, so that gas can flow into the cartridge and flow out of the cartridge in the direction of the longitudinal axis.

BACKGROUND

Valves of this type are used on gas cartridges, in particular $CO_2$ cartridges, for water carbonators. Such water carbonators are also referred to as carbonators and typically have a gas cartridge connector by way of which the gas cartridge, or the valve of the gas cartridge, can be connected to the water carbonator. The valve of the gas cartridge can then be selectively opened by way of an activating device of the water carbonator, so as to retrieve gas, in particular $CO_2$, from the gas cartridge and to supply the latter to a vessel with liquid to be carbonated, for example potable water.

Such a valve for a gas cartridge is known from DE 20 2020 005 533 U1. The known valve comprises a cartridge connector opening by way of which gas can be filled into and retrieved from a receptacle space of the gas cartridge. This cartridge connector opening is disposed along a direction parallel to the longitudinal axis, so that gas can flow into and out of the receptacle space of the gas cartridge in the direction of the longitudinal axis. Furthermore provided in this valve is at least one external connector opening that opens laterally to the longitudinal axis, so that the gas during retrieval in the water carbonator can flow out of the valve in a direction perpendicular to the longitudinal axis. It has proven disadvantageous here that repulsive forces which act perpendicularly to the longitudinal axis of the valve, or of the gas cartridge, are caused by directing the gas laterally out of the valve, or the gas cartridge. Because gas cartridges in water carbonators of this type are typically disposed in an upright, i.e. vertical, position, forces in the horizontal direction that may lead to the gas cartridge tilting relative to a sealing contour of the water carbonator can be created when retrieving gas from the gas cartridge. Leakages between the gas cartridge and the water carbonator can occur as a result.

SUMMARY

The object of the present invention is to specify a valve, or a gas cartridge, in which lateral repulsive forces are reduced.

In order to achieve the object, a valve for selectively closing and selectively opening a gas cartridge for a water carbonator is proposed,

- wherein the valve is specified to hold a gas in the gas cartridge when it is closed and to provide a fluidic connection to the gas cartridge when it is opened,
- wherein the valve comprises a valve housing which has a cartridge connector opening that is aligned along a longitudinal axis of the valve, so that gas can flow into the gas cartridge and flow out of the gas cartridge in the direction of the longitudinal axis, and
- wherein the valve housing comprises at least one outlet opening which is disposed externally and along a direction parallel to the longitudinal axis in such a manner that gas can flow out of the valve in the direction parallel to the longitudinal axis.

The valve according to the invention is specified to be selectively closed and selectively opened so that retrieval of gas from the gas cartridge as well as filling of the gas cartridge with gas can be selectively performed. In the closed state of the valve, the gas can be held in the gas cartridge. When the valve is opened, a fluidic connection to the gas cartridge, in particular a receptacle space of the gas cartridge, is provided so that the retrieval, or the filling, can be performed. The retrieval of the gas from the gas cartridge can be performed by way of the outlet opening, wherein the outlet opening is disposed externally and oriented in such a manner that gas flows out of the valve in a direction parallel to the longitudinal axis of the valve housing in such a way that potential repulsive forces caused by the outflow act parallel to the longitudinal direction. In this way, repulsive forces perpendicular to the longitudinal direction can be reduced, or avoided. To this extent, lateral forces during the retrieval of gas are reduced in an upright arrangement of the gas cartridge with the valve in a water carbonator.

The outlet opening is preferably disposed in such a manner that the gas can escape in a direction that points away from the cartridge connector opening.

It is preferable when the valve housing has exactly one outlet opening which is disposed externally and along a direction parallel to the longitudinal axis in such a manner that gas can flow out of the valve in the direction parallel to the longitudinal axis. Alternatively, a plurality of outlet openings, for example two, three, four, five or six, can be provided.

Even when reference is made to at least one outlet opening in the advantageous design embodiments explained hereunder, these design embodiments comprise the alternative that exactly one outlet opening is present, as well as alternatives with a plurality of outlet openings.

According to one advantageous design embodiment of the invention it is provided that the at least one outlet opening is disposed so as to be spaced apart from the longitudinal axis. As a result of the outlet opening being disposed in such a manner, the delivery of the gas from the gas cartridge can take place in the direction parallel to the longitudinal axis as well as in a region of the valve that is spaced apart from the longitudinal axis, for example in a lateral peripheral region of the valve. For example, the valve can have a cylindrical design, and the at least one outlet opening can be at a distance in the radial direction from the cylinder axis.

According to one advantageous design embodiment of the invention it is provided that a ratio between the spacing of the outlet opening from the longitudinal axis and a spacing of the outlet opening from an external contour of the valve housing disposed parallel to the longitudinal axis is in the range from 10 to 1000, preferably in the range from 10 to 150, particularly preferably in the range 25 to 100. The spacings mentioned are preferably defined so as to proceed from a center of the outlet opening. The external contour of the valve housing is preferably the external contour of the valve housing in the region of the outlet opening, so that the spacing of the outlet opening from an external contour of the valve housing disposed parallel to the longitudinal axis is defined by a line perpendicular to the longitudinal axis in a cross-sectional plane that intersects the outlet opening. The ratio mentioned is particularly preferably in the range from 40 to 50, for example is 45. The choice of a ratio of this type can contribute toward the outflow of the gas from the valve taking place in a region at a lateral distance from the longitudinal axis, wherein the gas however flows out of the valve parallel to the longitudinal axis.

According to one advantageous design embodiment of the invention it is provided that the at least one outlet opening is designed to be in the shape of an annular segment, in particular a circular annular segment, or in the shape of an annulus, in particular a circular annulus. An outflow of the gas from the valve that is concentric with the longitudinal axis can be enabled by the annular segment-shaped, or annular, outlet opening. The annular segment-shaped, or annular, outlet opening is moreover less susceptible to blockages by contaminations and/or to closures due to deformations of the valve. If the valve housing comprises exactly one outlet opening, the latter is preferably designed to be circular-annular so that the outflow of the gas can take place across the entire annular area of an annulus. A non-symmetrical outflow of the gas, and repulsive forces caused thereby, can be reduced or avoided by such a single, circular-annular outlet opening.

According to one advantageous design embodiment of the invention it is provided that the valve housing comprises a housing core and a housing sleeve, wherein the at least one outlet opening is disposed between an internal contour of the housing sleeve and an external contour of the housing core. A design embodiment of this type, having a housing core and a housing sleeve, enables a cost-effective production of the valve housing, wherein the housing sleeve is joined to the housing core. It is therefore not necessary to utilize subtractive, in particular chip-removing, manufacturing methods in order to provide the outlet opening in the valve housing.

In this context, it is advantageous when the external contour of the housing core has a first diameter, and the external contour of the housing sleeve has a second diameter, wherein the ratio between the first diameter and the second diameter is in the range from 0.9 to 1, preferably in the range from 0.95 to 1 or in the range from 0.96 to 0.99, particularly preferably in the range from 0.97 to 0.99. For example, the ratio between the first diameter and the second diameter can be 0.985 or 0.980 or 0.990.

According to one advantageous design embodiment of the invention it is provided that the housing sleeve is non-releasably fastened, i.e. fastened so as not to be releasable in a non-destructive manner, to the housing core. The housing sleeve is preferably fastened to the housing core by way of a materially integral connection, for example a welded connection and/or a soldered connection and/or an adhesively bonded connection. Alternatively, it can be provided that the housing sleeve is fastened to the housing core by way of a force-fitting connection, for example by way of an interference-fit connection and/or a heat-shrunk connection. For example, an interference-fit connection, or interference fit, with the housing core can be formed at an end of the housing sleeve that lies opposite the outlet opening, in particular in that the internal contour of the housing sleeve is undersized by a predefined dimension in relation to the external contour of the housing core.

According to one advantageous design embodiment of the invention it is provided that the housing sleeve is fastened to the housing core so as not to be manually releasable, or not releasable using a standard tool, or releasable exclusively using a special tool. In this context, a standard tool is understood to mean a screw wrench, for example. In this context, a special tool is not a standard tool, in particular not a screw wrench. The housing sleeve is preferably fastened to the housing core by way of a friction-fitting connection, for example a threaded connection. The threaded connection here preferably has a static friction of its effective surfaces which is so high that the threaded connection cannot be released manually, i.e. by hand.

According to one advantageous design embodiment of the invention it is provided that the housing sleeve is at least partially disposed in an, in particular annular, fastening groove which is formed in the housing core. For example, an attachment region of the housing sleeve can be disposed within the fastening groove, and a region of the housing sleeve that faces away from the attachment region of the sleeve can project from the fastening groove. The attachment region is preferably designed to be annular, for example as an annular protuberance on an internal contour of the housing sleeve, or as an annular frontal end region.

According to one advantageous design embodiment of the invention it is provided that the housing core comprises a first housing core part and a second housing core part, wherein the fastening groove is disposed in a region between the first housing core part and the second housing core part. A design embodiment of this type of the housing core is in particular advantageous when the housing sleeve has an attachment region which is formed as an annular protuberance on the internal contour of the housing sleeve. Assembling the housing sleeve in the fastening groove is facilitated by the two-part design embodiment of the housing core.

In this context, a design embodiment in which the housing sleeve has an attachment region which is formed as an annular protuberance on an internal contour of the housing sleeve, and the attachment region of the housing sleeve engages behind the first housing core part and/or the second housing core part has proven to be particularly advantageous. To this extent, the attachment region can have an undercut which lies inside in the radial direction in terms of the first and/or second housing core part. This undercut can be designed to be annular, or in the shape of an annular segment, for example. A form-fitting connection between the housing sleeve and the housing core, which impedes or prevents the housing sleeve being released in the radial direction, can be enabled in this way.

According to one advantageous design embodiment of the invention it is provided that the valve housing comprises a fastening element by way of which the housing sleeve is non-releasably fastened to the housing core, i.e. so as not to be releasable in a non-destructive manner. The fastening element can enclose the housing sleeve and the housing core at least in portions. For example, the fastening element can have a receptacle opening in which the housing core and the housing sleeve are received, wherein the receptacle opening is undersized by a predefined dimension in relation to the common material thickness of the housing core and the housing sleeve. For connecting, the housing sleeve can be disposed around the housing core, and the fastening element can be pressed onto the housing sleeve, as a result of which the housing sleeve and the housing core are connected by a press fit.

According to one advantageous design embodiment of the invention it is provided that the valve housing comprises a fastening element by way of which the housing sleeve is non-releasably fastened to the housing core, wherein the fastening element is disposed in the fastening groove. The fastening element is preferably disposed, in particular pressed, in the fastening groove in such a manner that said fastening element fixedly establishes the housing sleeve in the fastening groove.

According to one advantageous design embodiment of the invention it is provided that the valve housing has a sealing element, in particular an annular seal, for sealing the housing sleeve in relation to the housing core, said sealing element being disposed on a side of the housing sleeve that lies opposite the outlet opening. The intermediate space between the housing core and the housing sleeve on that side that lies opposite the outlet opening can be sealed by the sealing element in such a way that any undesirable outflow of the gas other than on the path through the outlet opening is prevented.

According to one advantageous design embodiment of the invention it is provided that the housing core has a supply duct which is disposed so as to extend transversely, in particular perpendicularly, to the longitudinal direction and in an intermediate space between the housing sleeve and the housing core opens out in an aperture. A fluidic connection between an interior space of the valve housing and the outlet opening, or between the cartridge connector opening and the outlet opening, can be provided by the supply duct. The intermediate space between the housing sleeve and the housing core preferably extends parallel to the longitudinal direction and has the at least one outlet opening.

According to one advantageous design embodiment of the invention it is provided that the housing core on a side of the aperture that faces the cartridge connector opening has a larger cross-sectional width, in particular a larger diameter, than on a side of the aperture that faces away from the cartridge connector opening. Owing to the different cross-sectional widths on the sides of the aperture, the outflowing gas which flows through the supply duct can be diverted in the direction parallel to the longitudinal axis and flow out of the outlet opening in this direction. To this extent, a step which is disposed at the level with the aperture of the supply duct can be provided on the external contour of the housing core. If the housing core is designed to be cylindrical in the region of the aperture, this housing core on a side of the aperture that faces the cartridge connector opening has a larger diameter than on a side of the aperture that faces away from the cartridge connector opening.

According to one advantageous design embodiment of the invention it is provided that a groove, in particular exactly one groove, which extends parallel to the longitudinal direction is disposed in the external contour of the housing core. The groove can further improve the guiding of the outflowing gas in the direction parallel to the longitudinal direction. Optionally, a plurality of grooves, in particular exactly two grooves, which extend in each case parallel to the longitudinal direction can be disposed in the external contour of the housing core.

In this context, it is advantageous when the groove is disposed in such a manner that the latter intersects the aperture of the supply duct or terminates in the aperture, so that the gas flowing through the supply duct can be directed into the groove. If two supply ducts are provided, it is preferably provided that the groove is disposed in such a manner that the latter intersects the aperture of both supply ducts. If two supply ducts are provided on opposite sides, it is preferable when two grooves which are in each case disposed in such a manner that they intersect the aperture in each case of one supply duct are provided.

According to one advantageous design embodiment of the invention it is provided that an, in particular annular, retaining element by way of which the valve is able to be fixedly established in a gas cartridge connector of a water carbonator is disposed on the valve housing. The retaining element preferably protrudes from the valve housing in a direction oblique, in particular perpendicular, to the longitudinal axis of said valve housing. When the valve is introduced into the gas cartridge connector of the water carbonator, for example by a movement in the direction of the longitudinal axis, the retaining element is able to be engaged from behind by a holding element of the water carbonator, and the valve, or the gas cartridge, can be fixedly established on the water carbonator as a result.

According to one advantageous design embodiment of the invention it is provided that a pressure relief valve, in particular comprising a rupture disk, which is configured to allow a positive pressure prevalent in the region of the cartridge connector opening to escape, is disposed on the valve housing. The rupture disk is preferably configured in such a manner that it ruptures at a predefined positive pressure in the region. A connection between the cartridge connector opening and the environment can be established due to the rupturing of the rupture disk. The pressure relief valve preferably comprises an external positive pressure outlet opening which opens laterally to the longitudinal axis.

According to one advantageous design embodiment of the invention it is provided that the valve has a cartridge closure element which is biased to a closed position in which the cartridge closure element closes a passage between the outlet opening and the cartridge connector opening, wherein the cartridge closure element is movable by an activating element of the valve in the direction of an open position in which the passage between the outlet opening and the cartridge connector opening is opened for discharging gas. The activating element of the valve is preferably movable along the longitudinal axis. The activating element can be activated by an activation element of a water carbonator, for example by an activation pin, which interacts with the activating element, when the valve, or the gas cartridge, is connected to a gas cartridge connector of the water carbonator. The cartridge closure element is preferably biased in the direction of the closed position by means of a first spring element. The first spring element can be designed as a coil spring, preferably as a compression coil spring. The above-mentioned open position of the cartridge closure element can additionally be used to release a passage between the cartridge connector opening and any potential filling opening of the valve housing for inducting gas into the gas cartridge.

According to one advantageous design embodiment of the invention it is provided that the valve housing on a side that lies opposite the cartridge connector opening has a filling opening by way of which gas can flow into the valve in the direction of the longitudinal axis. To this extent, the filling opening is aligned along a longitudinal axis of the valve. The filling opening offers the advantage that it is not necessary to fill the gas cartridge by way of the outlet opening.

According to one advantageous design embodiment of the invention it is provided that the valve housing on a side that lies opposite the cartridge connector opening has a filling opening by way of which gas can flow into the valve in the direction of the longitudinal axis, wherein the activating element comprises the filling opening. In a design embodiment of this type, the activating element has a dual function: It can be used, in particular depressed, for activating the gas retrieval, on the one hand, and it provides a filling opening for filling the gas cartridge. Therefore, it is possible to apply a compressive force in the direction of the longitudinal axis that activates the retrieval of gas—in particular by way of an activation element of a water carbonator—as well as to incorporate gas into the valve when filling in the direction of the longitudinal axis.

According to one advantageous design embodiment of the invention it is provided that the valve housing on a side that lies opposite the cartridge connector opening has a filling opening by way of which gas can flow into the valve in the direction of the longitudinal axis, wherein the filling opening is disposed between an external contour of the activating element and an internal contour of the valve housing, wherein the filling opening is in particular designed to be annular. This design embodiment offers the possibility that the activating element can be used, in particular depressed, for activating the gas retrieval. The activating element can have one or a plurality of inner, in particular lateral, openings which opens or open into an intermediate space between the external contour of the activating element and the internal contour of the valve housing. Gas which flows into the valve in the direction of the longitudinal axis can be directed into the activating element, in particular along a direction transverse, preferably perpendicular, to the longitudinal direction by way of this inner opening, or openings.

According to a structurally advantageous design embodiment of the invention it is provided that the outlet opening has a smaller spacing from the cartridge connector opening than the filling opening. Alternatively or additionally, it is structurally advantageous when the filling opening is disposed so as to be offset from the outlet opening in terms of the longitudinal axis. For example, the filling opening can be aligned along the longitudinal axis of the valve, so that gas can flow into the valve in the direction of the longitudinal axis, while the outlet opening is disposed so as to be spaced apart from the longitudinal axis and is disposed along a direction parallel to the longitudinal axis in such a manner that gas can flow out of the valve in the direction parallel to the longitudinal axis.

According to one advantageous design embodiment of the invention it is provided that the valve has an inlet closure element that is biased by a second spring element to a closed position in which the inlet closure element closes a passage between the filling opening and the cartridge connector opening or the filling opening, wherein the second spring element is conceived in such a manner that the inlet closure element by applying a predefined gas pressure at the filling opening is movable to an open position in which the passage between the filling opening and the cartridge connector opening, or the filling opening, is opened for inducting gas. Thus, a filling sub-valve in the manner of a check valve, which holds gas in the valve and admits gas if a gas pressure that exceeds the predefined gas pressure is prevalent at the filling opening, is provided by the biased inlet closure element. The second spring element can be designed as a coil spring, preferably as a compression coil spring.

In this context, it is advantageous when the valve additionally has a cartridge closure element which is biased to a closed position in which the cartridge closure element closes a passage between the filling opening and the cartridge connector opening, wherein the cartridge closure element by the inlet closure element of the valve is movable in the direction of an open position in which the passage between the filling opening and the cartridge connector opening is opened for inducting gas. To this extent, by moving the inlet closure element to its open position, the cartridge closure element can also be moved to its open position. In this way, a fluidic connection by way of which the filling of the gas cartridge can be performed can be established between the inlet opening and the cartridge connector opening. The cartridge closure element is preferably the same cartridge closure element which in the closed position closes a passage between the outlet opening and the cartridge connector opening.

The valve, in particular in the region of the cartridge connector opening, preferably comprises a thread for connecting the valve to an opening of a gas cartridge. The thread is preferably designed as an external thread in such a way that it can be screwed to a corresponding internal thread of the gas cartridge.

For achieving the object mentioned at the outset, a gas cartridge for connecting to a gas cartridge connector of a water carbonator, having an above-described valve, is furthermore proposed.

The same advantages and effects which have already been explained in the context of the valve according to the invention can be achieved by the gas cartridge.

The gas cartridge, in particular in the region of an opening, preferably has a thread, particularly preferably an internal thread, by way of which the valve is linked. The gas cartridge can be designed according to the standard DIN EN ISO 7866:2021-05, for example.

The advantageous design embodiments and features described in the context of the valve can be used individually or in combination in the gas cartridge.

The invention furthermore relates to a method for filling an above-described gas cartridge, wherein the valve housing on a side that lies opposite the cartridge connector opening has a filling opening by way of which gas is inducted into the valve in the direction of the longitudinal axis.

As a result of the method, the filling of a gas cartridge can be performed by supplying gas along the longitudinal axis of the valve. In the process, a gas cartridge which is filled with gas and from which gas can be retrieved by way of the at least one outlet opening in a direction parallel to the longitudinal axis of the valve is provided. In this way, repulsive forces perpendicular to the longitudinal direction can be reduced or avoided when retrieving gas.

According to an advantageous design embodiment of the method according to the invention it is provided that the valve has an inlet closure element that is biased by a spring element to a closed position in which the inlet closure element closes the filling opening, wherein a predefined gas pressure is applied at the filling opening in order to move the inlet closure element to an open position. To this extent, the biased inlet closure element forms a type of check valve which is opened by exceeding the predefined gas pressure at the inlet opening. In the open position of the inlet closure element, gas can then be incorporated into the valve through the inlet opening.

According to one advantageous design embodiment of the invention it is provided that a fluidic connection between the outlet opening and the environment is sealed. For example, it is possible that one or a plurality of sealing elements which seal the outlet opening bear on an external contour of the valve housing.

Alternatively or additionally, the advantageous design embodiments and features described in the context of the valve can also be used individually or in combination in the method.

Further details, features and advantages of the invention are derived from the drawings and from the description hereunder of preferred exemplary embodiments by means of the drawings. The drawings herein simply illustrate exemplary embodiments of the invention, which do not limit the concept of the invention.

DETAILED DESCRIPTION

Identical parts are always provided with the same reference signs in the various figures and are therefore generally also only identified or mentioned once in each case.

Figure 1:
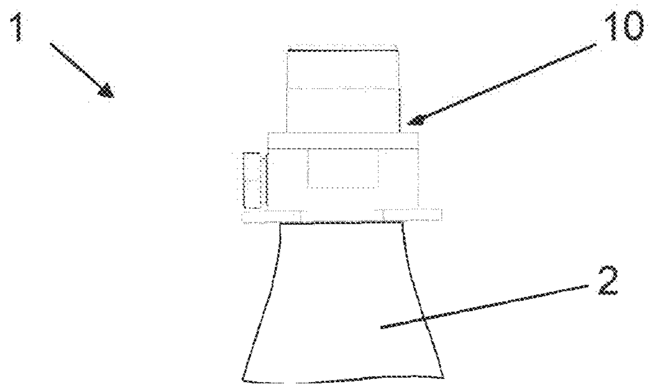
FIG. 1 shows a gas cartridge according to one exemplary embodiment of the invention in a lateral view.

Shown in FIG. 1 is a gas cartridge 1 according to one exemplary embodiment of the invention. The gas cartridge 1 is configured to be connected to a gas cartridge connector of a water carbonator. The gas cartridge 1 comprises a receptacle space 2 having an opening on which is disposed a valve 10 according to the invention for selectively closing and selectively opening the gas cartridge 1. In the closed position of the valve 10, a gas can be held in the gas cartridge 1, and, in the opened position, a fluidic connection for directing gas into the gas cartridge 1 or for retrieving said gas from the latter can be provided. FIG. 1 shows that region of the gas cartridge 1 that comprises the valve 1. The gas cartridge 1 is shown in an upright position. In such an upright position, the gas cartridge 1 in a water carbonator can be connected to the correspond gas cartridge connector.

Figure 2:
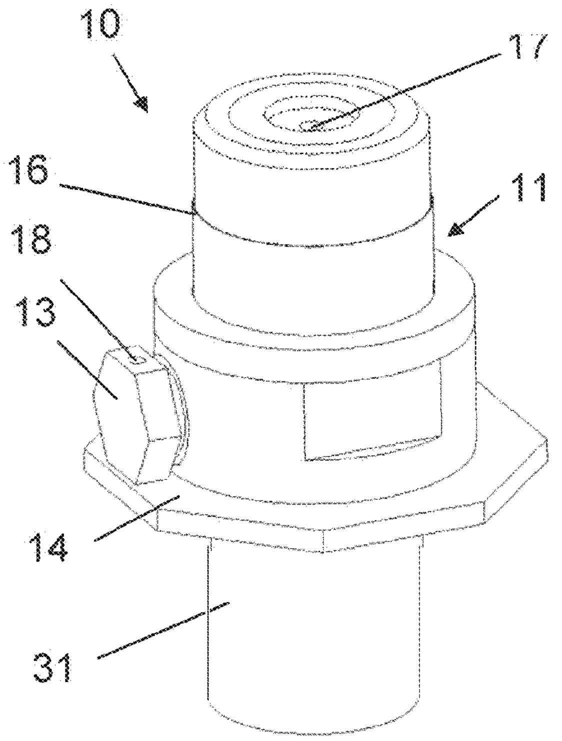
FIG. 2 shows a valve according to one exemplary embodiment of the invention in a perspective illustration.
Figure 3:
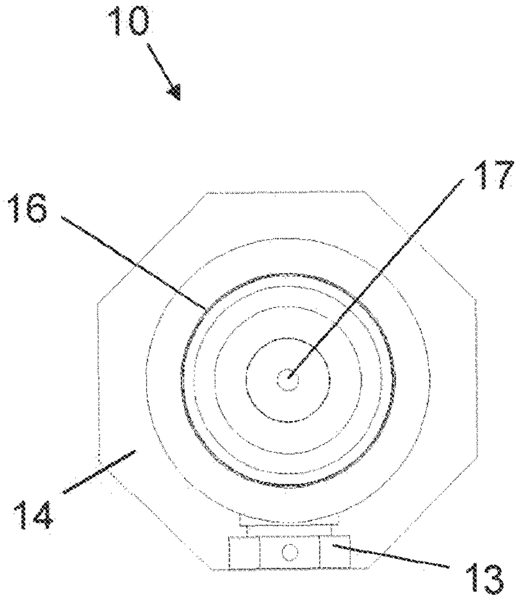
FIG. 3 shows the valve according to FIG. 2 in a top view.

The illustrations in FIGS. 2 and 3 show an exemplary embodiment of a valve 10 for selectively closing and selectively opening a gas cartridge 1 for a water carbonator, which can be used in the gas cartridge 1 according to FIG. 1. The valve 10 is specified to hold a gas in the gas cartridge 1 when it is closed and to provide a fluidic connection to the gas cartridge 1 when it is opened. The valve 10 comprises a valve housing 11 which has a cartridge connector opening 15 which is aligned along a longitudinal axis L of the valve 10 so that gas can flow into the gas cartridge 1 and flow out of the gas cartridge 1 in the direction of the longitudinal axis L.

The valve housing 11 is connected to an annular retaining element 14 by way of which the valve 10 can be fixedly established in a gas cartridge connector of a water carbonator. For this purpose, the retaining element 14 can be engaged from behind by a suitable holding element of the water carbonator. The retaining element 14 is fastened to the external side of the valve housing 11. The retaining element 14 has a circular clearance in which part of the valve housing 11, in particular part of a valve core 30 of the valve housing 11, is received. The external contour of the retaining element 14 in the exemplary embodiment is designed to be octagonal, but may alternatively have a deviating shape, for example circular, quadrangular, pentagonal, hexagonal or heptagonal. Provided between the retaining element 14 and the valve housing 11 is a sealing element 20, presently an annular seal. The retaining element 14 can be disposed between a projection of the valve housing 11 and a vessel housing of the gas cartridge 1. Alternatively, the retaining element 14 can be formed integrally with the valve housing 11.

Furthermore disposed on the valve housing 11 is a pressure relief valve 13 which comprises a rupture disk 19. The pressure relief valve 13 can permit a positive pressure prevalent in the region of the cartridge connector opening to escape in that the rupture disk 19 ruptures.

The valve housing 11 comprises a circular annular outlet opening 16 which is disposed externally and along a direction parallel to the longitudinal axis L in such a manner that gas can flow out of the valve 10 in the direction parallel to the longitudinal axis L. The outlet opening 16 is disposed so as to be spaced apart from the longitudinal axis L and enables the gas to flow out in a direction parallel to the external wall of the valve housing 11. To this extent, the outlet opening 16 is provided close to the external wall of the valve housing 11 on the latter. A ratio between the spacing of the outlet opening 16 from the longitudinal axis L and a spacing of the outlet opening 16 from an external contour of the housing sleeve 33 disposed parallel to the longitudinal axis L is in the range from 10 to 1000, preferably in the range 10 to 150, particularly preferably in the range 25 to 100, for example in the range 40 to 50, in particular is 45.

The construction of a first exemplary embodiment of a valve 10 according to FIGS. 1 to 3 is to be explained by means of the illustrations in FIGS. 4 to 10.

Figure 4:
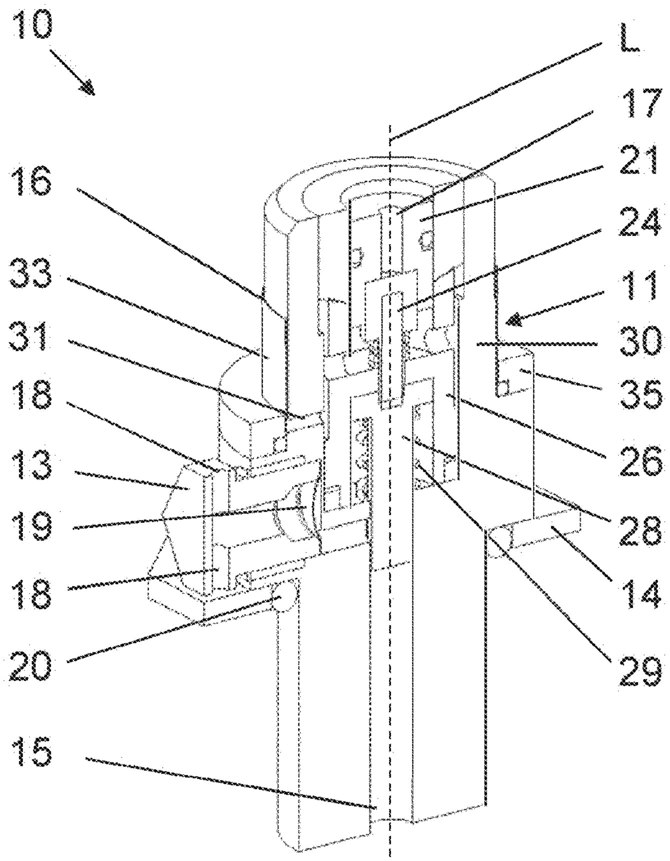
FIG. 4 shows a first exemplary embodiment of a valve according to the invention according to FIG. 2 in a sectional perspective view.
Figure 5:
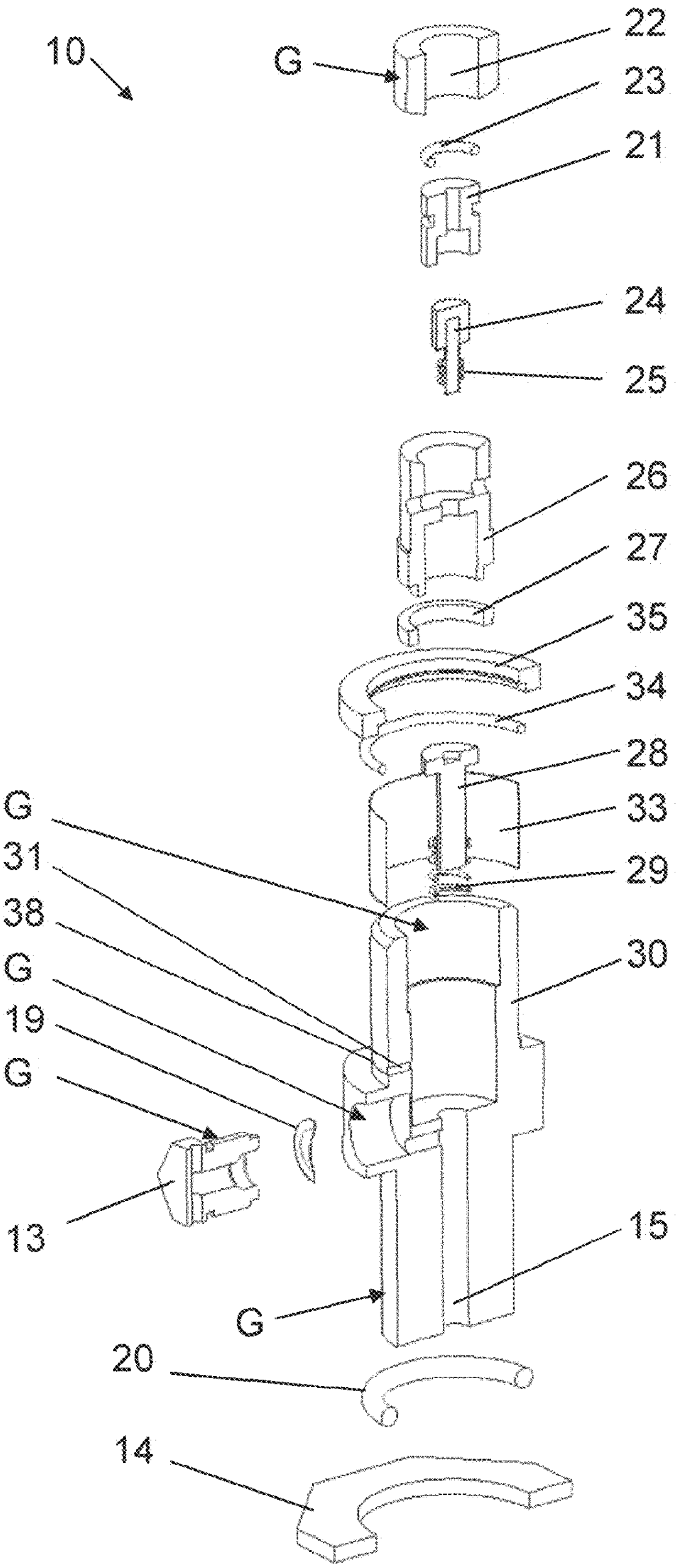
FIG. 5 shows a sectional exploded illustration of the valve according to FIG. 4.

In the sectional illustration in FIG. 4, the valve 10 is shown in an operationally ready state. In contrast, FIG. 5 shows an exploded illustration of the same valve 10. Surfaces that comprise a thread are identified by the reference sign G in the exploded illustration according to FIG. 5.

The valve housing 11 of the valve 10 comprises a housing core 30 and a housing sleeve 33 which is disposed on the housing core 30 so as not to be releasable, i.e. not releasable in a non-destructive manner. Provided for fastening the housing sleeve 33 to the housing core 30 is a fastening element 35 as a further part of the valve housing 11. The fastening element 35 is designed in the manner of a ring which is attached to the assembly of the housing sleeve 33 and the housing core 30. An annular bore of the fastening element 35 here is undersized to a predefined dimension so that an interference fit of the fastening element 35 is achieved on the assembly of the housing sleeve 33 and the housing core. To this extent, the housing sleeve 33 is connected to the housing core 30 in a force-fitting and non-releasable manner by the fastening element 35.

An annular intermediate space which opens out in the outlet opening 16 is formed between the housing sleeve 33 and the housing core 30. To this extent, the circular annular outlet opening 16 is located between an internal contour of the housing sleeve 33 and an external contour of the housing core 30. The gas from the intermediate space 36 can flow out of the outlet opening in a direction parallel to the longitudinal axis L, cf. FIGS. 6 and 7. In order to seal the intermediate space on that side of the housing sleeve 33 that lies opposite the outlet opening 16, the valve housing 11 has a sealing element 34, in particular an annular seal. The sealing element is disposed on a side of the housing sleeve 33 that lies opposite the outlet opening 16. As can be derived from the illustrations in FIGS. 6 and 7, the sealing element 34 bears in and on the housing sleeve 33 as well as a projection of the housing core 30 and is held, in particular compressed, in position by the fastening element 35.

The intermediate space 36 is fluidically connected to the interior space of the valve 10 by way of a supply duct 31. The supply duct 31 is formed in the housing core 30 and extends transversely, in particular perpendicularly, to the longitudinal direction L. The aperture of the supply duct 31 into the intermediate space 36 between the housing sleeve 33 and the housing core 30 is identified by the reference sign 32.

An insert 26 is disposed within the housing core 30. The insert 26 is held in a force-fitting manner in the housing core 30 by a ring 27. Disposed in the interior space of the housing core 30 is a cartridge closure element 28 which is biased to a closed position which is shown in FIG. 4 and in which the cartridge closure element 28 closes a passage between the outlet opening 16 and the cartridge connector opening 15, presently a passage in the insert 26. The bias is caused by a spring element 29. The cartridge closure element 28 is movable counter to the bias by an activating element 21 of the valve 10 in the direction of an open position in which the passage between the outlet opening 16 and the cartridge connector opening 15 is opened for discharging gas. The activating element 21 is disposed externally on a side of the valve 10 that lies opposite the cartridge connector opening 15, and can be moved in the direction of the longitudinal axis L so as to discharge gas out of the valve 10. The activating element 21 is coupled to the cartridge closure element 28 by way of an inlet closure element 24 in such a manner that a compressive force can be transmitted to the cartridge closure element 28. The activating element 21 is mounted so as to be movable along the longitudinal direction in a holder 22 which is screwed to the housing core 30 on that side of the housing core 30 that lies opposite the cartridge connector opening 15. A sealing element 23, presently an annular seal, is disposed for sealing between the activating element 21 and the holder.

The inlet closure element 24, in a closed position, closes a filling opening 17 which is disposed in the activating element 21. The filling opening is configured so that gas can flow into the valve 10 in the direction of the longitudinal axis L if the inlet closure element 24 releases said filling opening. The inlet closure element 24 is biased to the closed position, which is shown in FIG. 4 and in which the inlet closure element 24 closes the filling opening 17, by a spring element 25. The spring element 25 is configured in such a manner that the inlet closure element 24 by applying a predefined gas pressure at the filling opening 17 is able to be moved to an open position in which the filling opening 17 is open for inducting gas. In the open position of the inlet closure element 24, gas can be inducted into the interior space of the valve housing 11 through the filling opening 17, and then be directed through the passage in the insert 26 in the direction of the cartridge connector opening 15.

Figure 6:
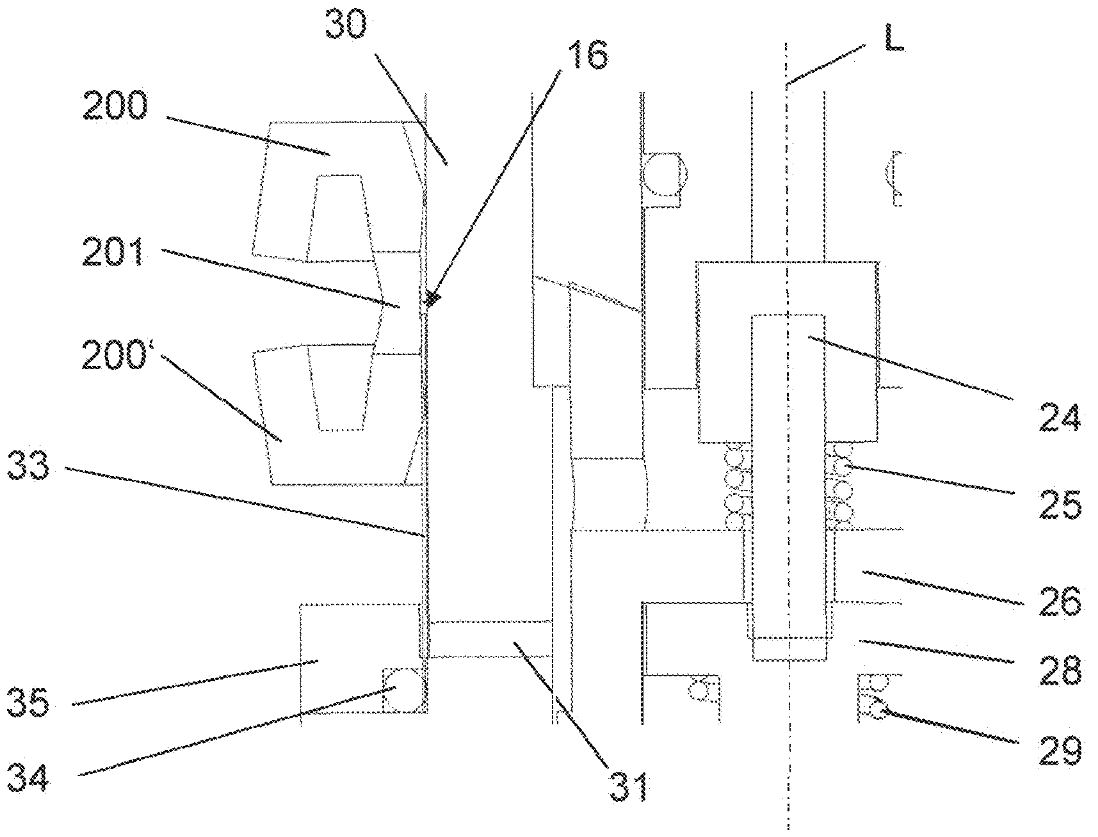
FIG. 6 shows a sectional view of part of the valve according to FIG. 4 for explaining the retrieval of gas from the valve.

Shown in FIG. 6 is a detailed illustration of a valve 10 which is connected to a gas cartridge connector of a water carbonator. The gas cartridge connector comprises a sealing device 200, 200' which bears on an external contour of the valve 10 and seals a region around the outlet opening 16. In the present case, the sealing device has an upper sealing portion 200 which seals above the outlet opening 16, and a lower sealing portion 200' which seals below the outlet opening 16. In this way, a sealed space in which the gas flowing out of the outlet opening 16 parallel to the longitudinal direction L is received is achieved in the intermediate space between the two sealing portions 200, 200'. The sealing device 200, 200' shown in FIG. 6 furthermore comprises a lateral opening 201 through which the gas flowing out of the valve 10, in particular the outlet opening 16, parallel to the longitudinal axis L is discharged in a direction oblique to the longitudinal axis L, cf. arrow A in FIG. 8. Then, the gas can be directed, for example by way of a line, to a carbonating device of the water carbonator, by way of which the gas can be directed in a vessel filled with water.

Figure 7:
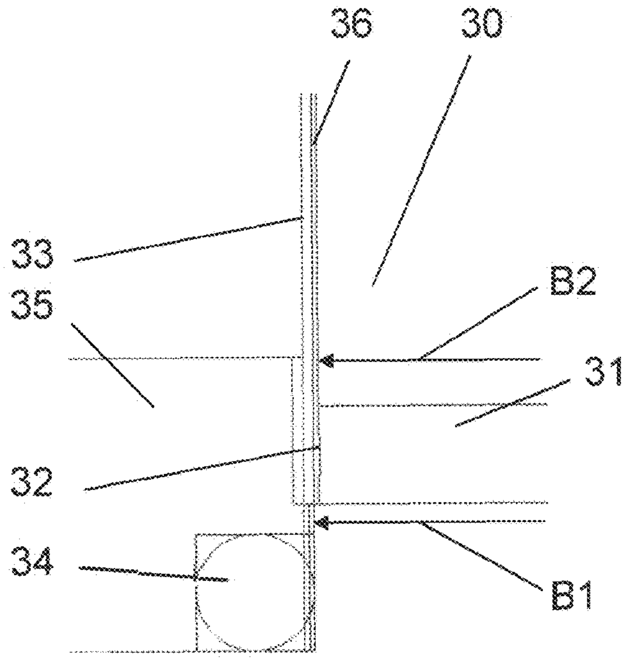
FIG. 7 shows a sectional detailed view of the region of the aperture of the supply duct of the valve according to FIG. 4.
Figure 8:
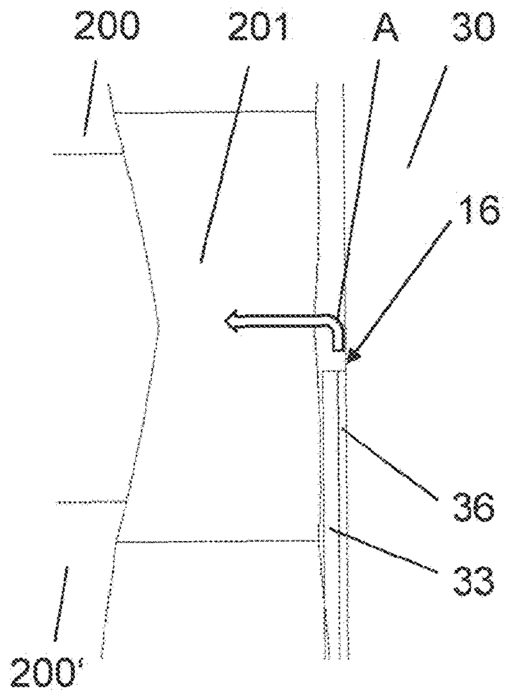
FIG. 8 shows a sectional detailed view of the region of the gas outlet of the valve according to FIG. 4.

The detailed illustration in FIG. 7 shows that region of the valve housing 11 in which the supply duct 31 opens into the intermediate space 36 between the housing core 30 and the housing sleeve 33 therein. The fastening element 35 which connects the housing sleeve 33 to the housing core 30 is disposed laterally of the aperture 32. For sealing, the sealing element 34 is likewise held between a projection of the housing core 30 and the housing sleeve by the fastening element 35. Furthermore, a step 38 in the external contour of the housing core 30 is provided in the region of the aperture 32, cf. FIG. 5. The step 38 manifests itself in that the housing core 30 on a side of the aperture 32 that faces the cartridge connector opening 15 has a larger cross-sectional width B1, presently a larger diameter, than the cross-sectional width B2, presently the diameter on that side of the aperture 32 that faces away from the cartridge connector opening 15, cf. FIG. 7. In the present exemplary embodiment, the intermediate space 36 between the housing sleeve 33 and the housing core 30 is derived from this step 38 on that side of the aperture 32 that faces away from the cartridge connector opening 15. In contrast, the housing sleeve 33 bears directly on the housing core 30 on that side of the aperture 32 that faces the cartridge connector opening 15.

Figure 9:
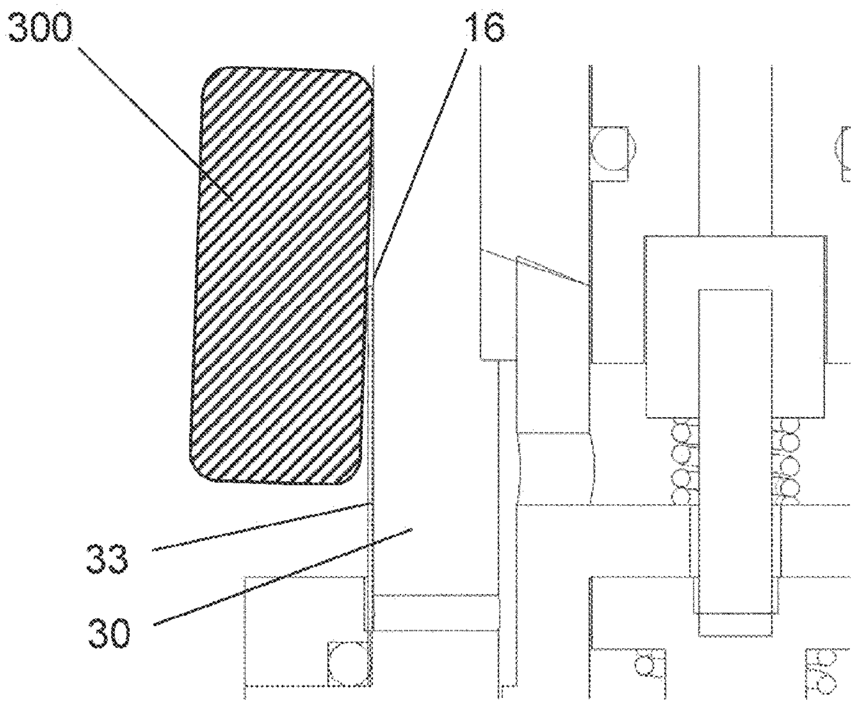
FIG. 9 shows a sectional illustration of part of the valve according to FIG. 4 for explaining the filling of gas into the valve according to a first variant.
Figure 10:
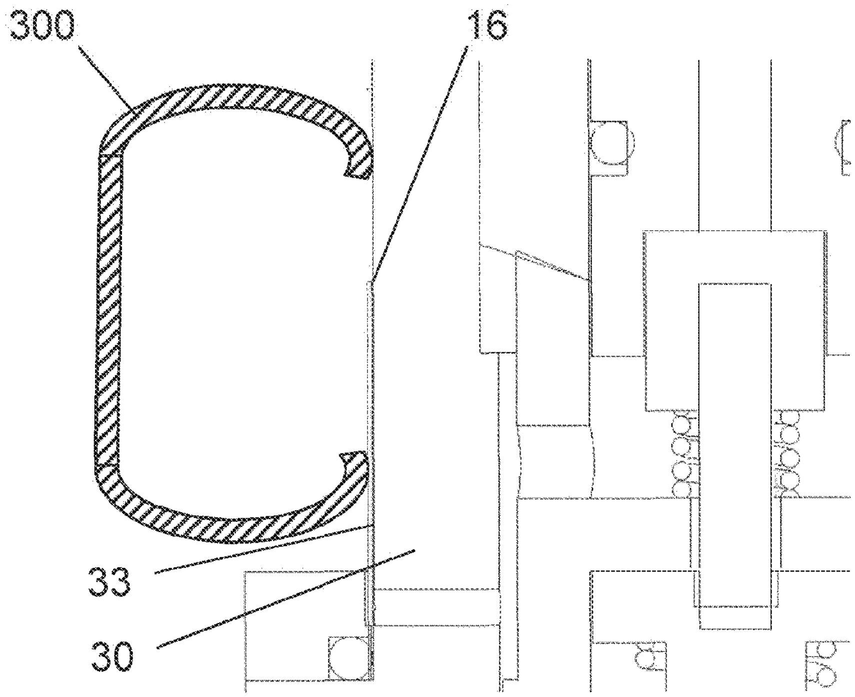
FIG. 10 shows a sectional illustration of part of the valve according to FIG. 4 for explaining the filling of gas into the valve according to a second variant.

The illustrations in FIGS. 9 and 10 show states which can be assumed on that side of the valve 10 that lies opposite the cartridge connector opening 15 when filling the gas cartridge 1, shown in FIG. 1, by way of the filling opening 17, so as to seal a fluidic connection between the outlet opening 16 and the environment. This is required in order to prevent any undesirable leakage of the gas by way of the outlet opening 16 when inducing gas by way of the filling opening 17. Instead, the gas which is inducted into the valve 10 by way of the filling opening 17, can then be directed by way of the cartridge connector opening 15 into the receptacle space of the gas cartridge 1. The illustrations in FIGS. 9 and 10 show in each case that a sealing element 301 which seals the region around the outlet opening 16 in relation to the environment is disposed on the external contour of the valve housing 11.

Figure 11:
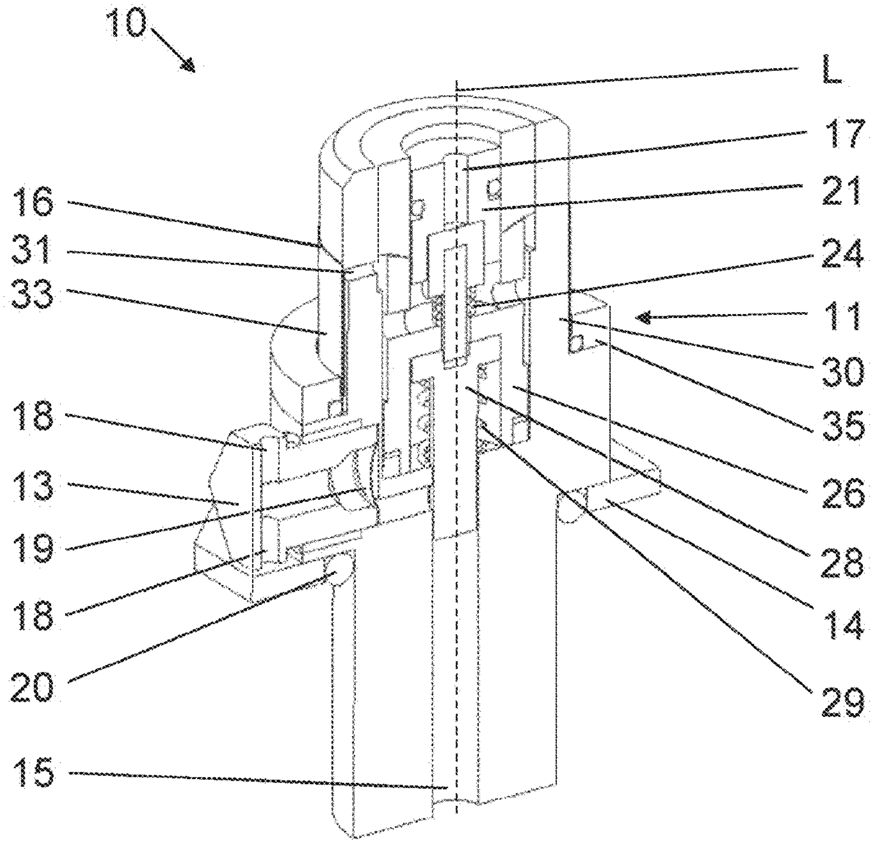
FIG. 11 shows a second exemplary embodiment of a valve according to the invention according to FIG. 2 in a sectional perspective view.
Figure 12:
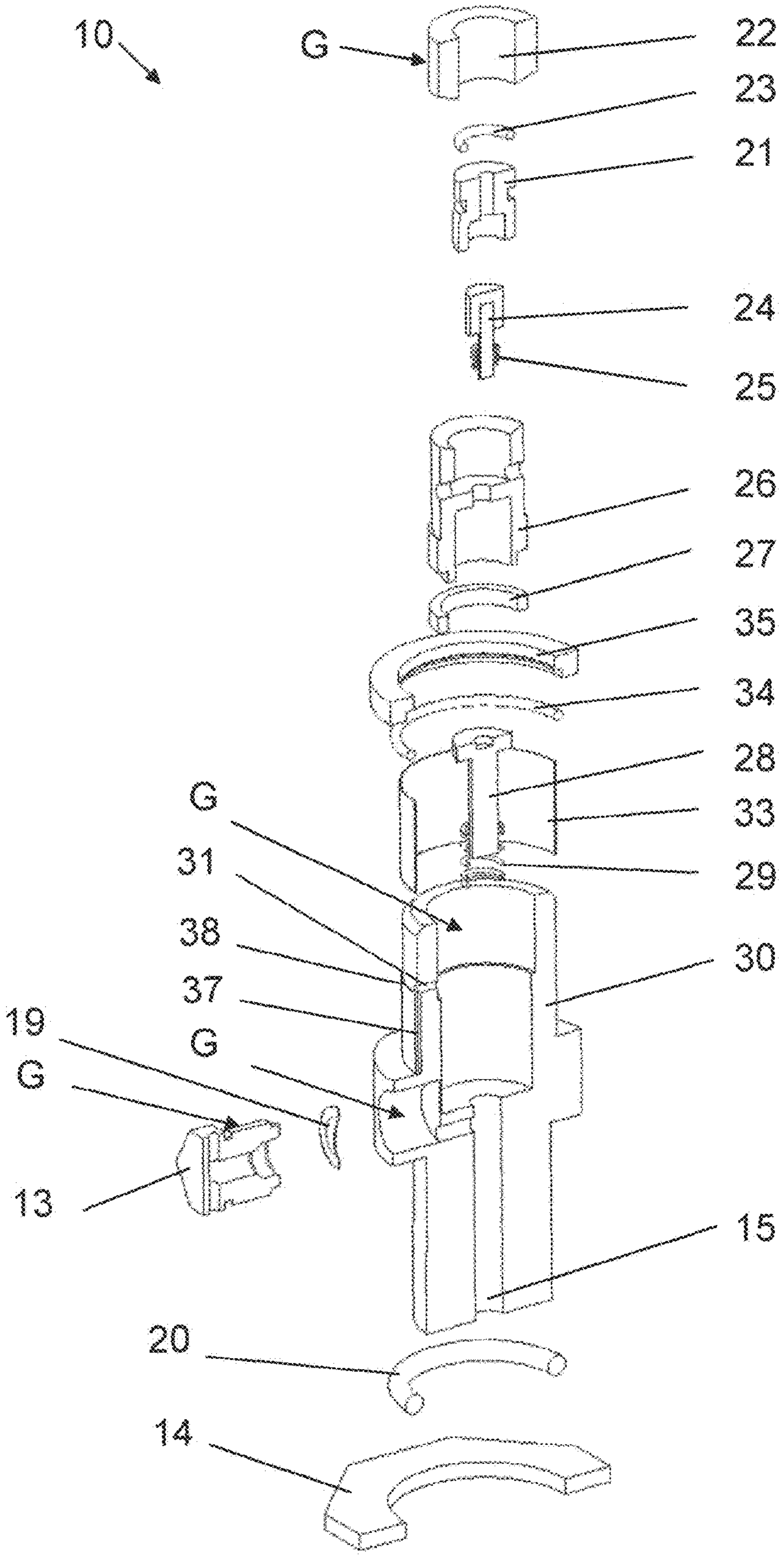
FIG. 12 shows a sectional exploded illustration of the valve according to FIG. 11.
Figure 13:
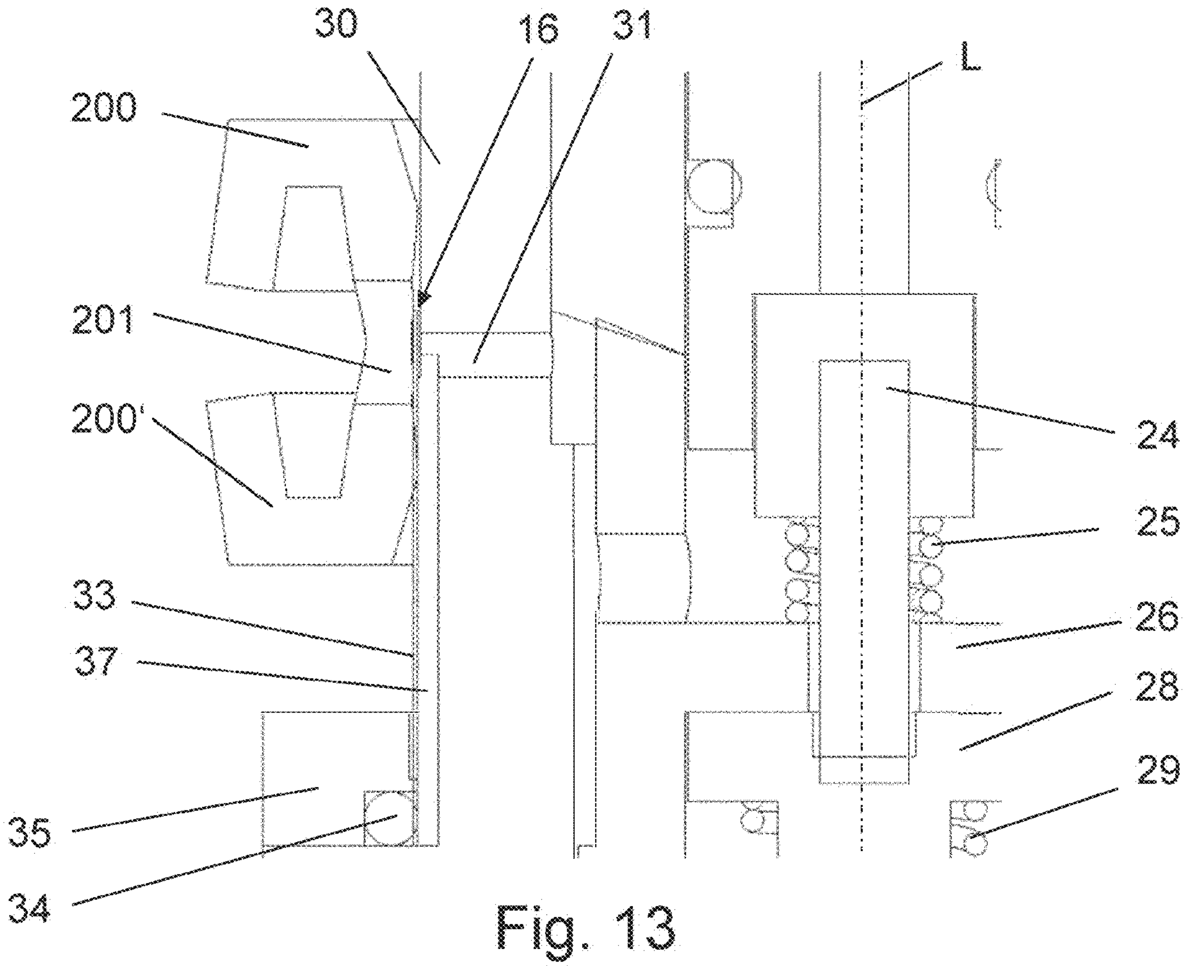
FIG. 13 shows a sectional illustration of part of the valve according to FIG. 11 for explaining the retrieval of gas from the valve.
Figure 14:
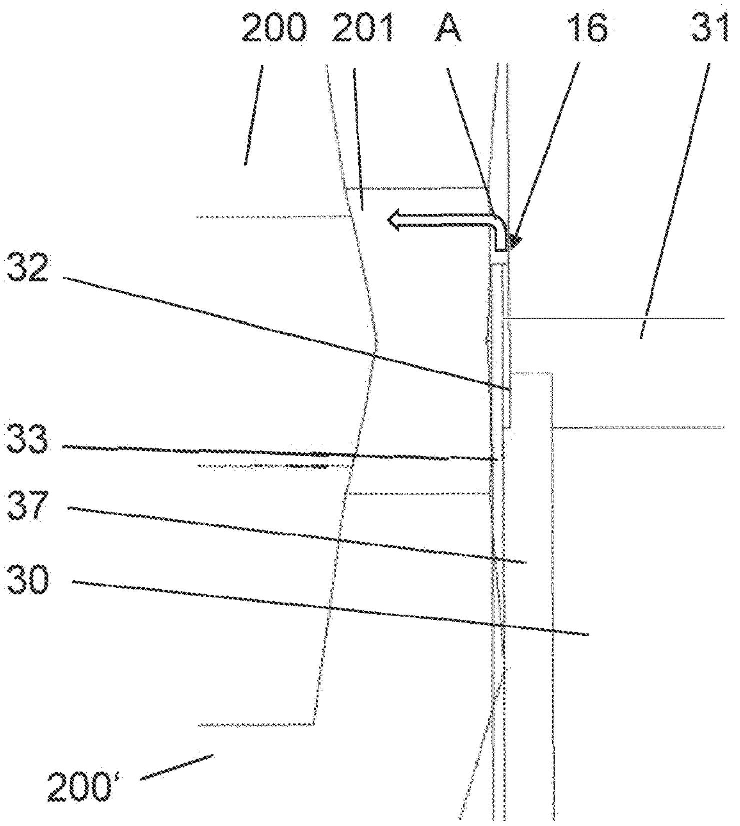
FIG. 14 shows a sectional detailed view of the region of the aperture of the supply duct of the valve according to FIG. 11.
Figure 15:
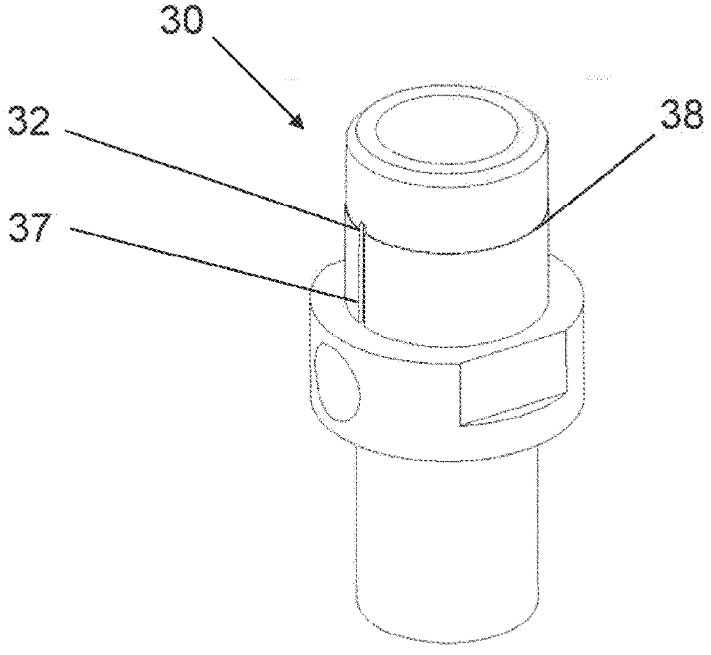
FIG. 15 shows a perspective illustration of the valve core of the valve according to FIG. 11.

A second exemplary embodiment of a valve 10 according to FIGS. 1 to 3 will be explained by means of the illustrations in FIGS. 11 to 15. This valve 10 comprises elements which act the same way as the elements of the valve 10 shown in FIGS. 4 to 10. These elements are provided with identical reference signs and will not be explained again. Instead, reference is made to the corresponding description pertaining to FIGS. 4 to 10 in terms of these elements. As opposed to the valve 10 according to the first exemplary embodiment, the supply duct 31 in the valve 10 according to the second exemplary embodiment is disposed at another location of the housing core 30. In comparison to FIG. 4, the supply duct 31 in FIG. 11 is provided so as to be further remote from the cartridge connector opening 15, i.e. presently displaced upward. Accordingly, the step 38 is also located at a position which is further remote from the cartridge connector opening 15, cf. FIG. 12 in comparison to FIG. 5.

In the second exemplary embodiment, a groove 37 which extends parallel to the longitudinal direction L is additionally disposed in the external contour of the housing core 30. The groove 37 is disposed in such a manner that it intersects the aperture 32 of the supply duct 31, or terminates in the aperture 32.

According to a variant of the first exemplary embodiment (FIGS. 4 to 10), such a groove 37 which extends parallel to the longitudinal direction L can be provided on the external contour of the housing core 30. The groove 37 is preferably disposed in such a manner that it intersects the aperture 32 of the supply duct 31, or terminates in the aperture 32.

The explanations pertaining to FIGS. 9 and 10 in terms of filling also apply in an analogous manner to a gas cartridge 1 which comprises a valve 10 according to the second exemplary embodiment.

Figure 16:
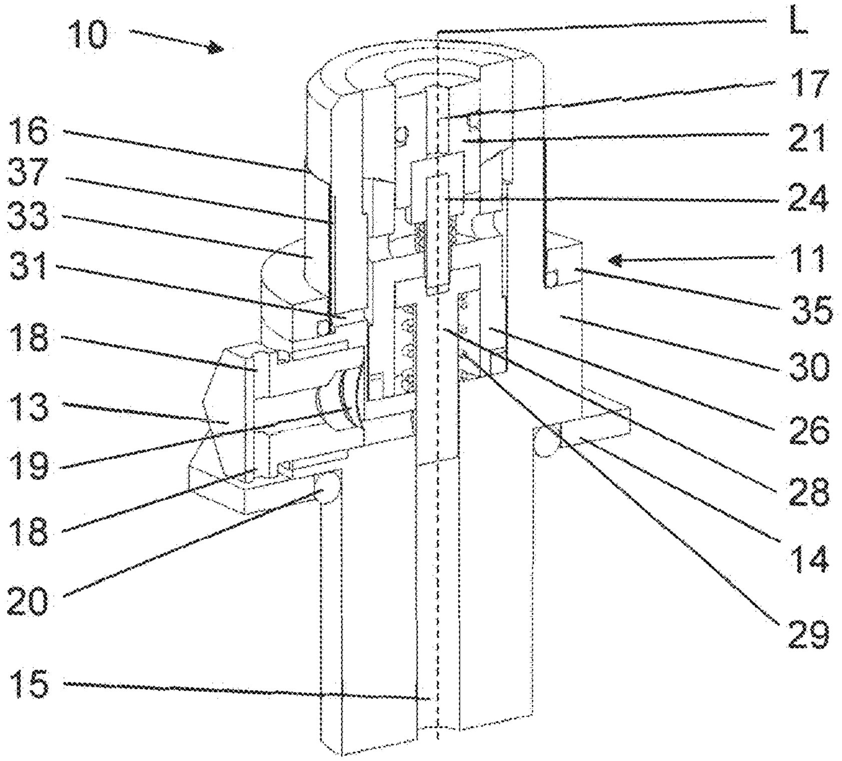
FIG. 16 shows a third exemplary embodiment of a valve according to the invention according to FIG. 2 in a sectional perspective view.
Figure 17:
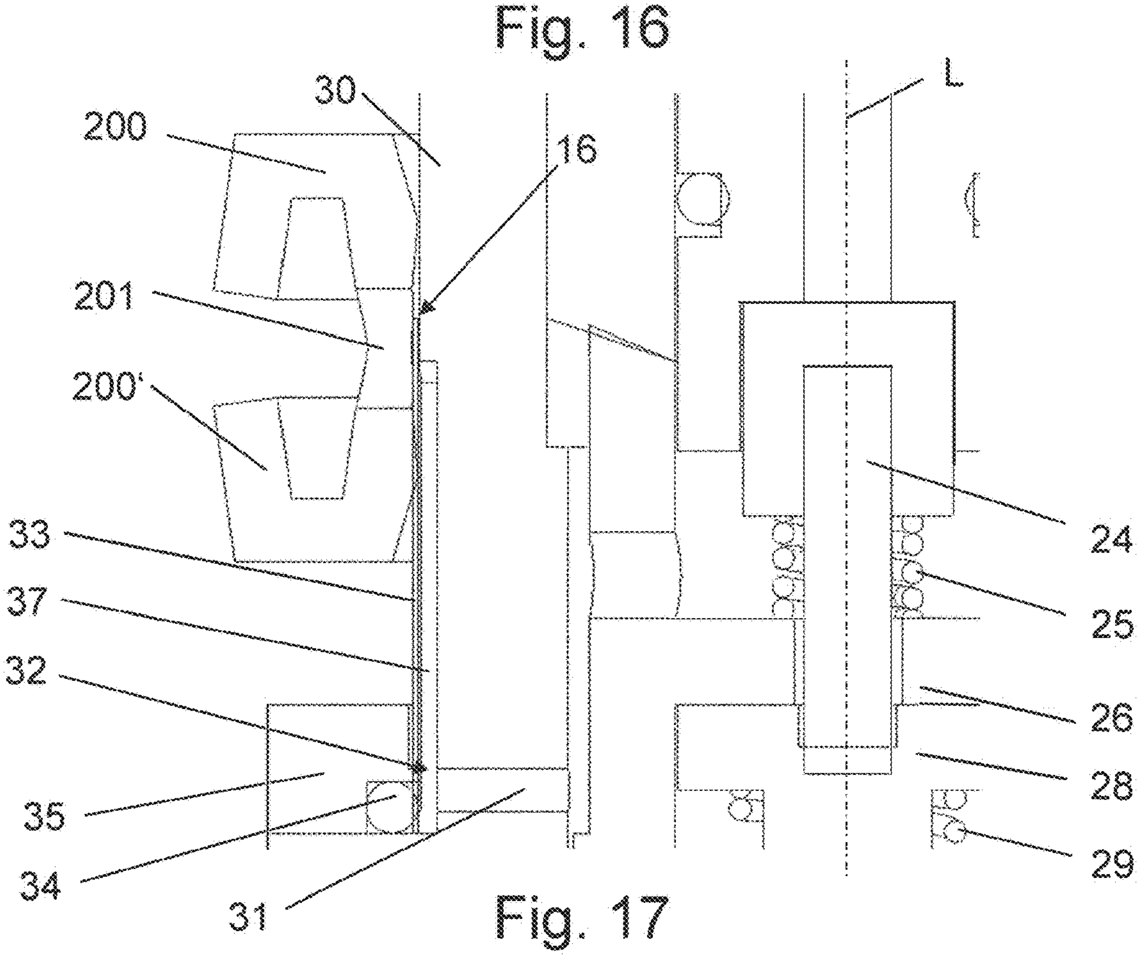
FIG. 17 shows a sectional illustration of part of the valve according to FIG. 16 for explaining the retrieval of gas from the valve.

A third exemplary embodiment of a valve 10 according to FIGS. 1 to 3 will be explained by means of the illustrations in FIGS. 16 and 17. This valve 10 comprises elements which act the same way as the elements of the valve 10 shown in FIGS. 4 to 10. These elements are provided with identical reference signs and will not be explained again. Instead, reference is made to the corresponding description pertaining to FIGS. 4 to 10 in terms of these elements. As opposed to the valve 10 according to the first exemplary embodiment, a groove 37, in particular exactly one groove 37, which extends parallel to the longitudinal direction L is disposed in the external contour of the housing core 30 in the valve 10 according to the third exemplary embodiment. The groove 37 is disposed in such a manner that it intersects the aperture 32 of the supply duct 31, in particular of the exactly one supply duct 31.

The explanations pertaining to FIGS. 9 and 10 in terms of filling also apply in an analogous manner to a gas cartridge 1 which comprises a valve 10 according to the third exemplary embodiment.

Figure 18:
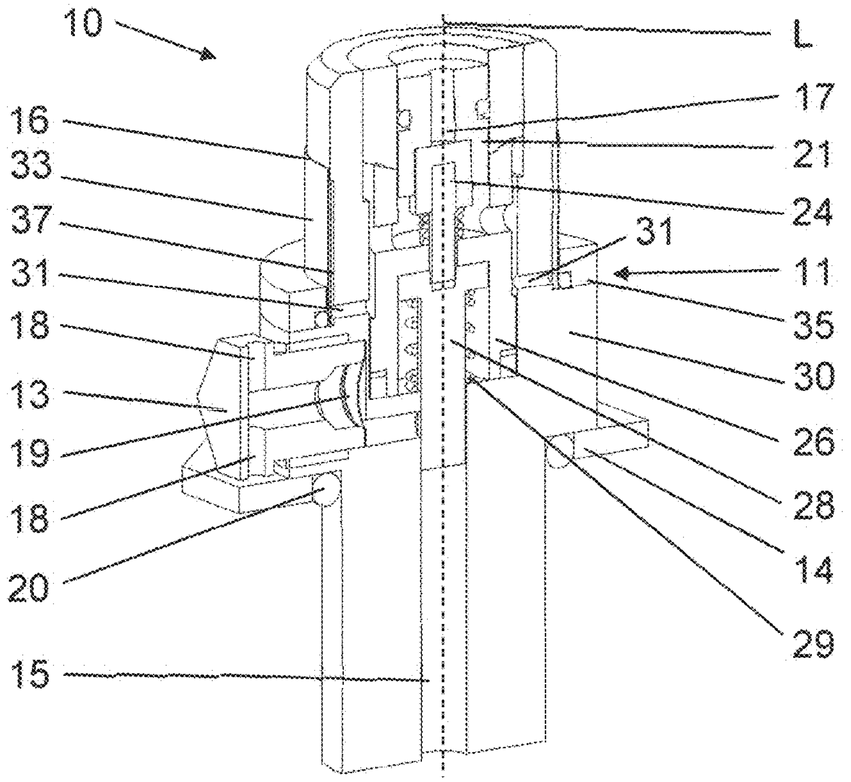
FIG. 18 shows a fourth exemplary embodiment of a valve according to the invention according to FIG. 2 in a sectional perspective view.
Figure 19:
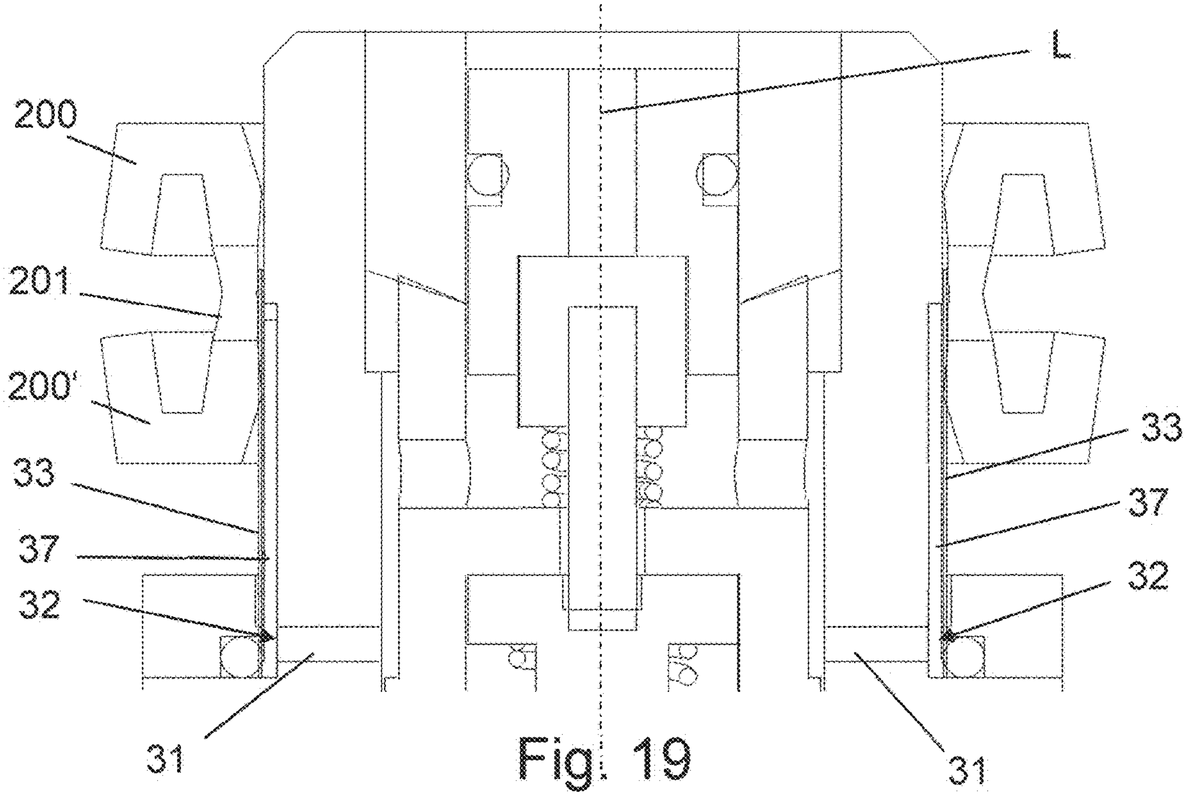
FIG. 19 shows a sectional illustration of part of the valve according to FIG. 18 for explaining the retrieval of gas from the valve.

A fourth exemplary embodiment of a valve 10 according to FIGS. 1 to 3 will be explain by means of the illustrations in FIGS. 18 and 19. This valve 10 comprises elements which act the same way as the elements of the valve 10 shown in FIGS. 4 to 10. These elements are provided with identical reference signs and will not be explained again. Instead, reference is made to the corresponding description pertaining to FIGS. 4 to 10 in terms of these elements. As opposed to the valve 10 according to the first exemplary embodiment, two grooves 37 which extend parallel to the longitudinal direction L are disposed in the external contour of the housing core 30 in the valve 10 according to the fourth exemplary embodiment. Furthermore, the valve 10 according to the fourth exemplary embodiment comprises two supply ducts 31 which are disposed on diametrically opposite sides of the housing core. The valve 10 preferably comprises exactly two supply ducts 31. The grooves 37 are disposed in such a manner that they intersect in each case the aperture 32 of one of the supply ducts 31.

Figure 20:
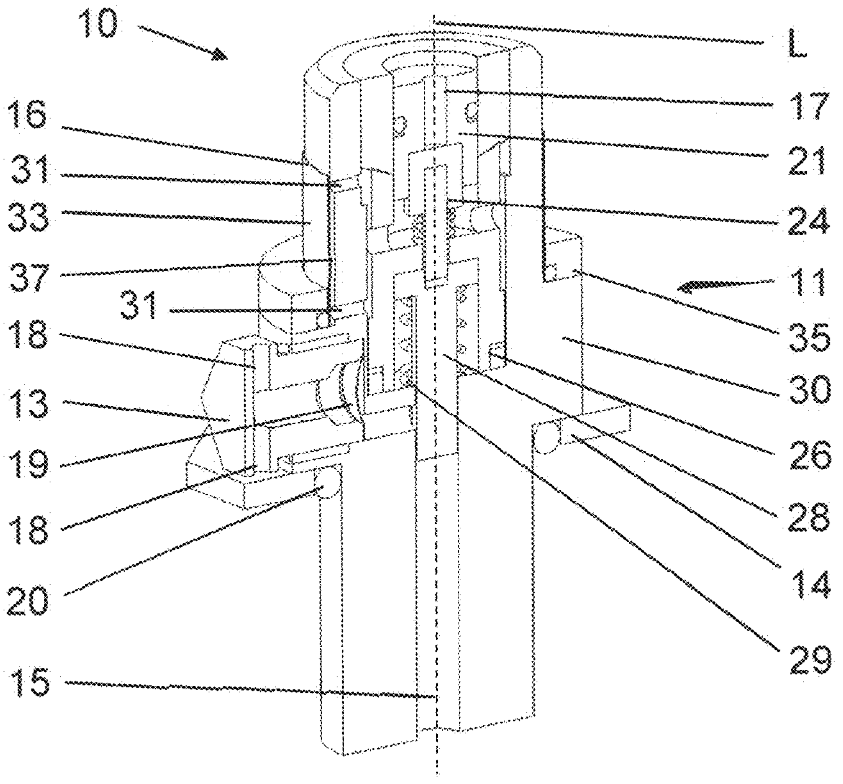
FIG. 20 shows a fifth exemplary embodiment of a valve according to the invention according to FIG. 2 in a sectional perspective view.
Figure 21:
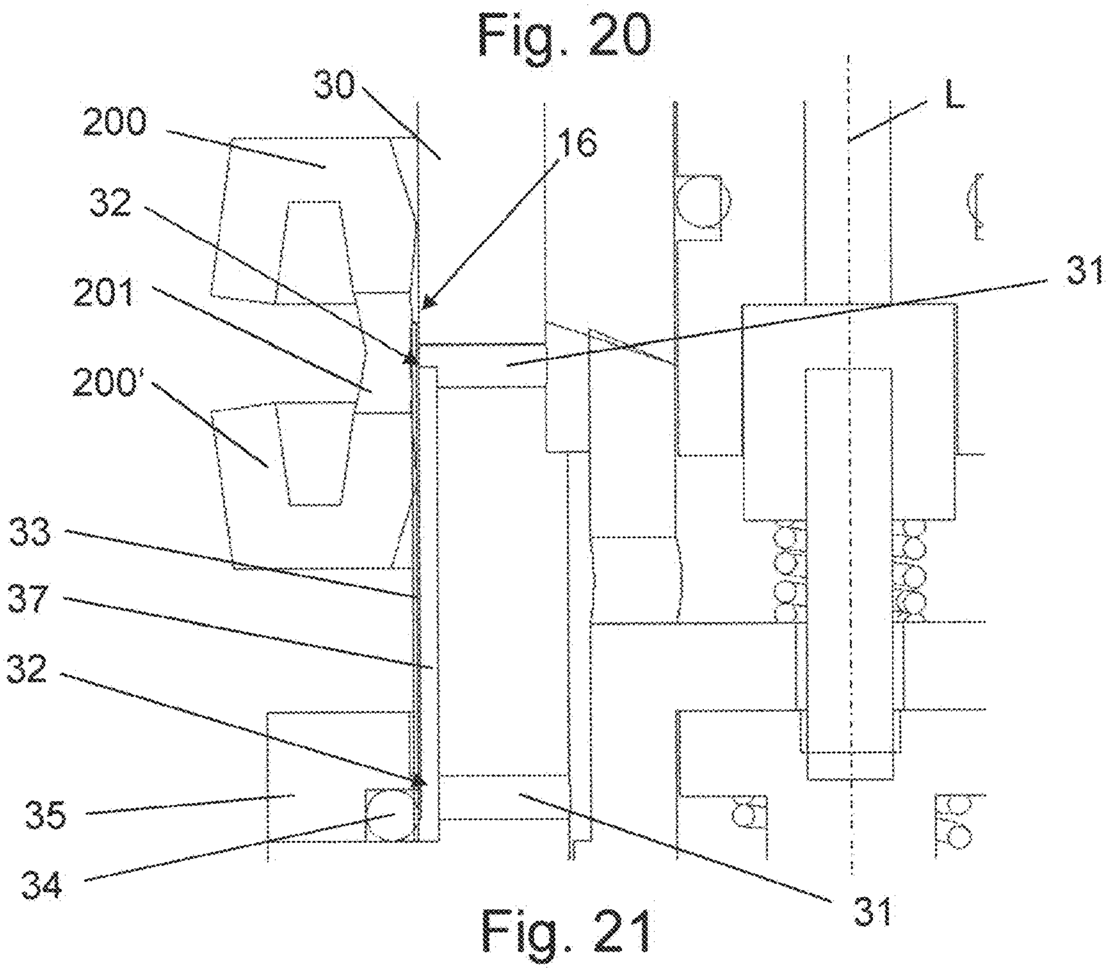
FIG. 21 shows a sectional illustration of part of the valve according to FIG. 20 for explaining the retrieval of gas from the valve.

The explanations pertaining to FIGS. 9 and 10 in terms of filling also apply in an analogous manner to a gas cartridge 1 which comprises a valve 10 according to the fourth exemplary embodiment. A fifth exemplary embodiment of a valve 10 according to FIGS. 1 to 3 will be explained by means of the illustrations in FIGS. 20 and 21. This valve 10 comprises elements which act in the same way as the elements of the valve 10 shown in FIGS. 4 to 10. These elements are provided with identical reference signs and will not be explained again. Instead, reference is made to the corresponding description pertaining to FIGS. 4 to 10 in terms of these elements. As opposed to the valve 10 according to the first exemplary embodiment, a groove 37, in particular exactly one groove 37, which extends parallel to the longitudinal direction L is disposed in the external contour of the housing core 30 in the valve 10 according to the fifth exemplary embodiment. The groove 37 is disposed in such a manner that it intersects the aperture 32 of a first supply duct 31, or terminates in the aperture 32. Furthermore, the valve 10 according to the fifth exemplary embodiment comprises an additional second supply duct 31 which opens out into the same groove 37 as the other supply duct 31.

The explanations pertaining to FIGS. 9 and 10 in terms of filling also apply in an analogous manner to a gas cartridge 1 which comprises a valve 10 according to the fifth exemplary embodiment.

The illustrations in FIGS. 22 to 26 shows a sixth and seventh exemplary embodiment of a valve 10 for selectively closing and selectively opening a gas cartridge 1 for a water carbonator, which can alternatively be used in the gas cartridge 1 according to FIG. 1. The valves 10 according to these exemplary embodiments are specified to hold a gas in the gas cartridge 1 when it is closed and to provide a fluidic connection to the gas cartridge 1 when it is opened. The respective valve 10 comprises a valve housing 11 which has a cartridge connector opening 15 which is aligned along a longitudinal axis L of the valve 10 in such a way that gas can flow into the gas cartridge 1 and flow out of the gas cartridge 1 in the direction of the longitudinal axis L. The construction of the valves 10 according to the sixth and seventh exemplary embodiment is similar to the construction of the valves 10 according to the preceding exemplary embodiments, which is why identical reference signs identify elements with identical function and reference in terms of the latter is made to the explanations pertaining to the preceding exemplary embodiments. The explanations pertaining to the preceding exemplary embodiments in terms of filling also apply in an analogous manner to a gas cartridge 1 which comprises a valve 10 according to the sixth or seventh exemplary embodiment.

Figure 22:
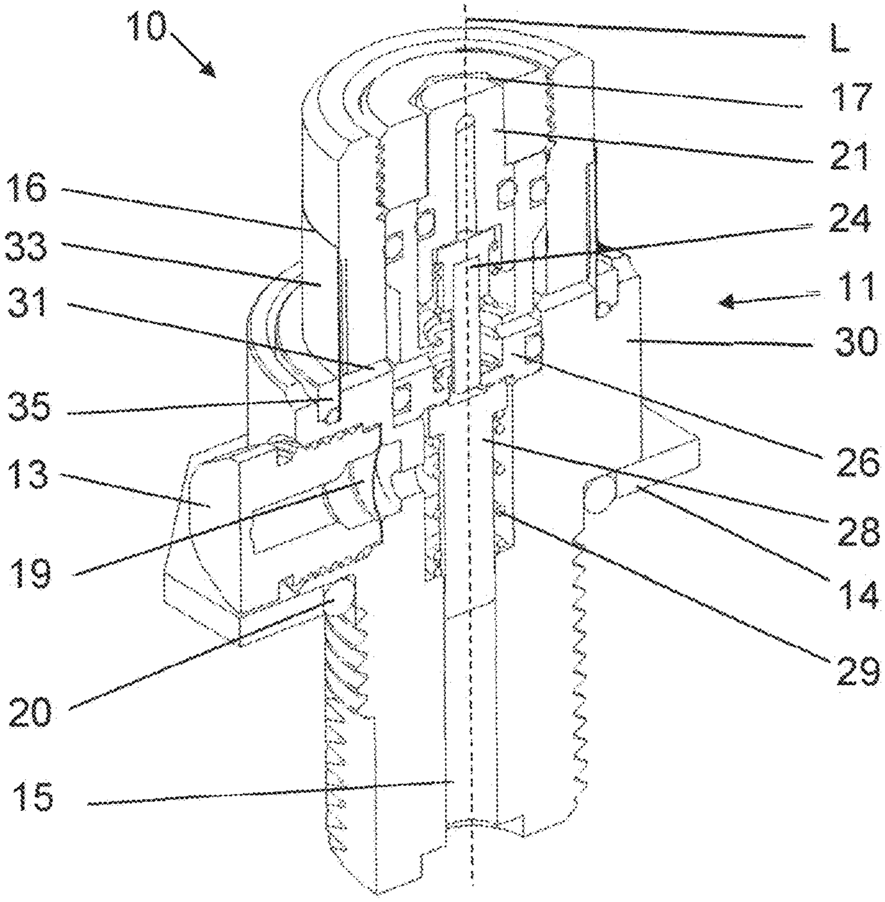
FIG. 22 shows a sixth exemplary embodiment of a valve according to the invention in a sectional perspective view.
Figure 23:
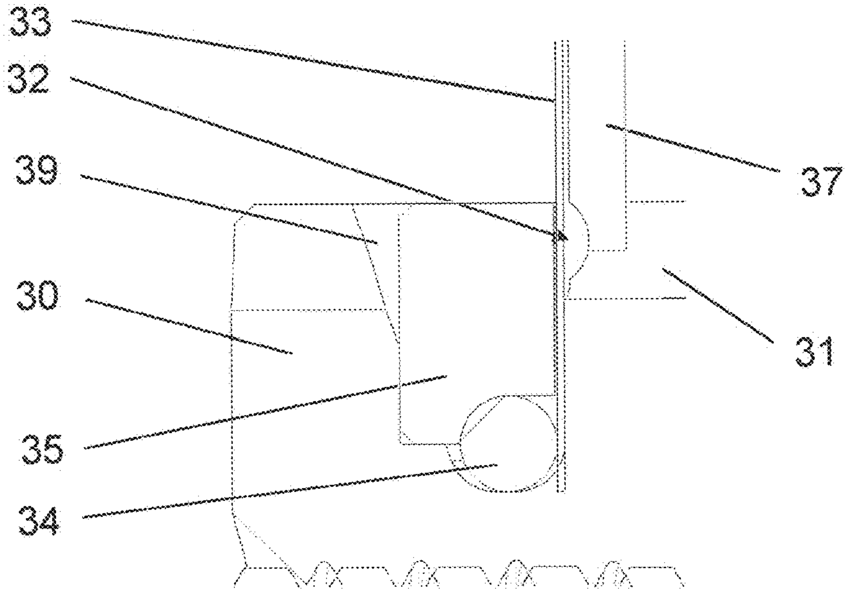
FIG. 23 shows a sectional illustration of part of the valve according to FIG. 22.

The valve 10 illustrated in FIGS. 22 and 23 has a valve body 11 with a housing core 30 which comprises a fastening groove 39. The fastening groove 39 is designed to be annular and opens in the direction of the longitudinal axis L. An annular, frontal region of the housing sleeve 33 is disposed in the fastening groove 39. Furthermore, a fastening element 35 is located within the fastening groove 39. The fastening element 35 is designed to be annular and pressed into the fastening groove 39 in such a way that the fastening element 35 fixedly establishes the housing sleeve 33 in the fastening groove 39. Furthermore provided between the fastening element 35 and the housing sleeve 33 is a sealing element 34, for example an annular seal, which is disposed within the groove.

Formed between the housing sleeve 33 and the housing core 30 is an annular outlet opening 16 which is disposed externally and along a direction parallel to the longitudinal axis L in such a manner that gas can flow out of the valve 10 in the direction parallel to the longitudinal axis L.

Figure 24:
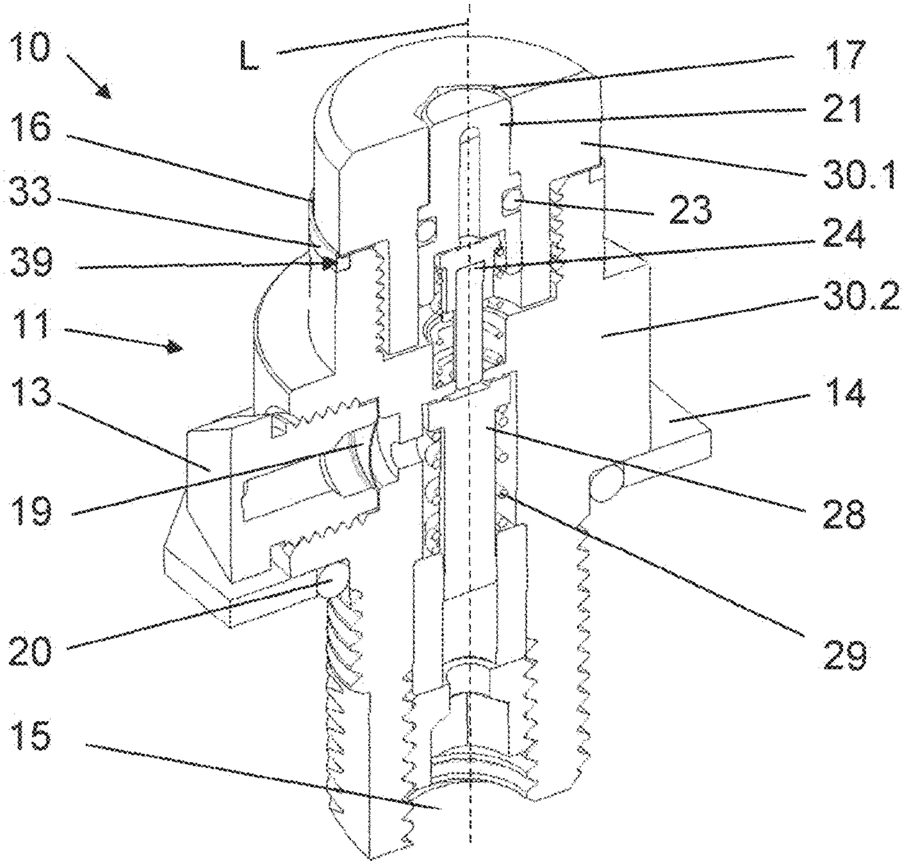
FIG. 24 shows a seventh exemplary embodiment of a valve according to the invention in a sectional perspective view.
Figure 25:
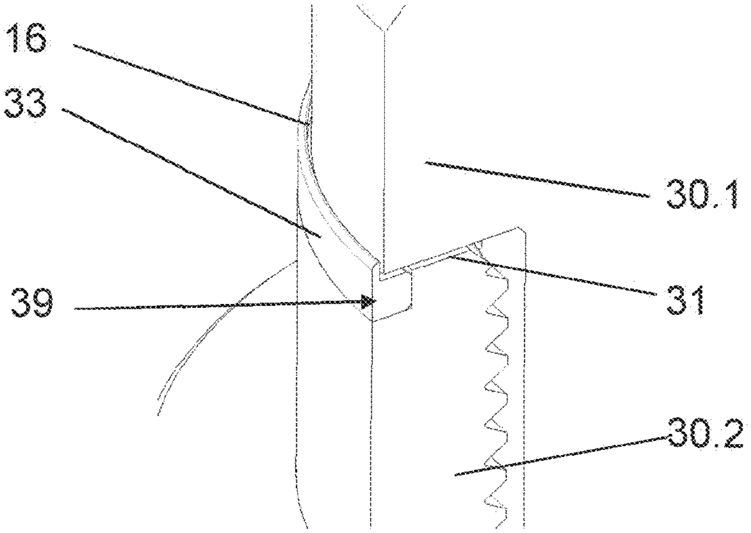
FIG. 25 shows a sectional illustration of part of the valve according to FIG. 24.
Figure 26:
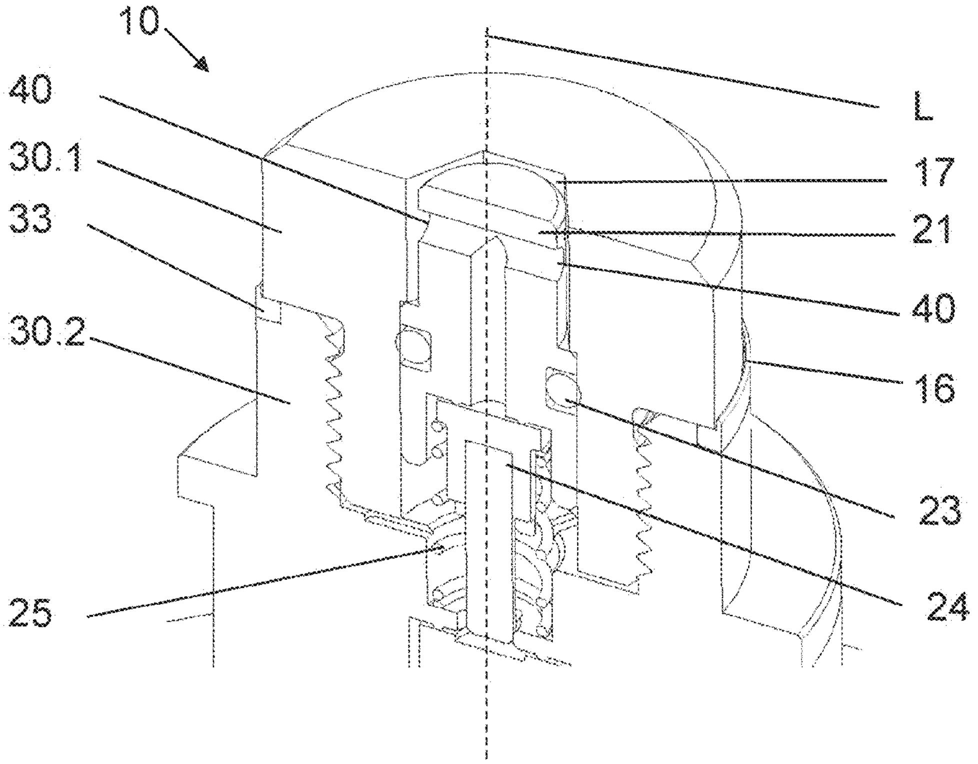
FIG. 26 shows a perspective sectional illustration of the valve according to FIG. 24 in the region of its filling opening.

The valve 10 illustrated in FIGS. 24, 25 and 26 has a valve body 11 with a housing core 30 which is designed in multiple parts. According to the exemplary embodiment, the housing core 30 comprises a first housing core part 30.1 and a second housing part 30.2. The housing core parts 30.1, 30.2 are connected to one another, for example by way of a threaded connection. This threaded connection is preferably non-releasable, i.e. non-releasable in a non-destructive manner, or not manually releasable or not releasable using a standard tool or releasable exclusively using a special tool. The first housing core part 30.1 and the second housing core part 30.2 are designed in such a manner that an annular fastening groove 39 is formed in a region between the first housing core part 30.1 and the second housing core part 30.2. An annular protuberance of the housing sleeve 33 is disposed and fixedly established in this fastening groove 39.

Formed between the housing sleeve 33 and the housing core 30 is an intermediate space having an annular outlet opening 16 which is disposed externally and along a direction parallel to the longitudinal axis L in such a manner that gas can flow out of the valve 10 in the direction parallel to the longitudinal axis L. The intermediate space between the housing sleeve 33 and the housing core 30 is fluidically connected to the interior space of the valve 10 by way of a supply duct 31. The supply duct 31 is formed between the first housing core part 30.1 and the second housing core part 30.2 and extends transversely, in particular perpendicularly, to the longitudinal direction L. In the exemplary embodiment, the supply duct 31 in its further profile, when viewed radially inward, first has a bend parallel to the longitudinal direction L, and then once again in a direction transverse, in particular perpendicular, to the longitudinal direction L. When viewed radially inward, the supply duct 31 opens into the interior space of the valve 10.

A cartridge closure element 28, which is biased to a closed position which is shown in FIG. 24 and in which the cartridge closure element 28 closes a passage between the outlet opening 16 and the cartridge connector opening 15, presently a passage in the second housing core part 30.2, is disposed in the interior space of the housing core 30. The bias is caused by a spring element 29. The cartridge closure element 28 is movable by an activating element 21 of the valve 10, counter to the bias, in the direction of an open position in which the passage between the outlet opening 16 and the cartridge connector opening 15 is opened for discharging gas. The activating element 21 is disposed externally on a side of the valve 10 that lies opposite the cartridge connector opening 15 and can be moved in the direction of the longitudinal axis L to allow gas out of the valve 10. The activating element 21 is coupled by way of an inlet closure element 24 to the cartridge closure element 28 in such a manner that a compressive force can be transmitted to the cartridge closure element 28. The activating element 21 is mounted in the first housing core part 30.1 so as to be movable along the longitudinal direction. A sealing element 23, presently an annular seal, for sealing is disposed between the activating element 21 and the first housing core part 30.1.

As can be derived from the illustration in FIG. 26, the valve housing 11 on a side that lies opposite the cartridge connector opening 15 has a filling opening 17 by way of which gas can flow into the valve 10 in the direction of the longitudinal axis L, wherein the filling opening 17 is disposed between an external contour of the activating element 21 and an internal contour of the valve housing 11. This filling opening 17 is designed to be annular. The activating element 21 comprises a plurality of inner, in particular lateral, openings 40 which open into an intermediate space between the external contour of the activating element 21 and the internal contour of the valve housing 11. Gas which flows into the valve in the direction of the longitudinal axis L can be inducted into the activating element 21, in particular along a direction transverse, preferably perpendicular, to the longitudinal direction by way of these inner openings 40. At a sufficient gas pressure, the inflowing gas can move the inlet closure element 24 to its open position in which the passage between the filling opening 17 and the cartridge connector opening 15 is opened. In the open position of the inlet closure element 24, gas can be directed through the filling opening 17 into the interior space of the valve housing 11 and then be directed through the passage in the second housing core part 30.2 in the direction of the cartridge connector opening 15.

A design embodiment having inner, lateral openings 40 of the activating element 21 is also provided in the sixth exemplary embodiment of a valve 10 according to the invention, shown in FIGS. 22 and 23.

According to a variant of the exemplary embodiment shown in FIGS. 24 to 26, the housing sleeve 33 is designed to be integral to the element formed as the second housing core part 30.2. To this extent, the valve housing 11 in this variant is formed substantially by the housing sleeve 33, 30.2 and the housing core 30.1. The outlet opening 16 is provided between an internal contour of the housing sleeve 33 and the external contour of the housing core 30.1. This variant offers the advantage that the joining of the housing sleeve 33, 30.2 and the housing core 30.1 can be simplified. In the variant of the exemplary embodiment shown in FIG. 24, the joining of the housing sleeve 33, 30.2 and the housing core 30.1 can be performed by way of a threaded connection which is non-releasable, i.e. non-releasable in a non-destructive manner, or not manually releasable or not releasable using a standard tool or releasable exclusively using a special tool.

According to an alternative variant of the exemplary embodiment shown in FIGS. 14 to 26, the housing sleeve 33 on its internal contour comprises an attachment region which engages behind the first housing core part 30.1 and/or the second housing core part 30.2. In this way, a form-fitting connection between the sleeve element and the housing core can be enabled, which impedes or prevents the housing sleeve 33 being released in the radial direction.

LIST OF REFERENCE SIGNS

1 Gas cartridge
2 Receptacle space
10 Valve
11 Valve housing
13 Pressure relief valve
14 Retaining element
15 Cartridge connector opening
16 Outlet opening
17 Filling opening
18 Pressure relief valve opening
19 Rupture disk
20 Sealing element
21 Activating element
22 Holder
23 Sealing element
24 Inlet closure element
25 Spring element
26 Insert
26' Detent face
27 Ring
28 Cartridge closure element
29 Spring element
30 Housing core
30.1 Housing core part
30.2 Housing core part
31 Supply duct
31' Supply duct
32 Aperture
33 Housing sleeve
34 Sealing element
35 Fastening element
36 Intermediate space
37 Groove
38 Step
39 Fastening groove
40 Opening
200, 200' Sealing device
201 Opening
A Flow direction
B1 Cross-sectional width
B2 Cross-sectional width
G Thread
L Longitudinal axis

The invention claimed is:

1. A valve for selectively closing and selectively opening a gas cartridge for a water carbonator, wherein the valve is configured to hold a gas in the gas cartridge when the valve is closed and to provide a fluidic connection to the gas cartridge when the valve is opened, wherein the valve comprises a valve housing having a cartridge connector opening that is oriented along a longitudinal axis of the valve, so that the gas is able to flow into the gas cartridge and flow out of the gas cartridge in a direction of the longitudinal axis, wherein the valve housing comprises at least one outlet opening which is arranged externally and arranged along a direction parallel to the longitudinal axis in such a manner that the gas is able to flow from the valve in the direction parallel to the longitudinal axis, and wherein the at least one opening is arranged spaced apart from the longitudinal axis.

2. The valve according to claim 1, wherein a ratio of a distance of the at least one outlet opening from the longitudinal axis to a distance of the at least one outlet opening from an external contour, arranged parallel to the longitudinal axis, of the valve housing lies in a range from 10 to 1000.

3. The valve according to claim 1, wherein the at least one outlet opening is ring shaped.

4. The valve according to claim 1, wherein the valve housing comprises a housing core and a housing sleeve, wherein the at least one outlet opening is arranged between an internal contour of the housing sleeve and an outer contour of the housing core.

5. The valve according to claim 4, wherein the housing sleeve is arranged at least partially in a ring-shaped fastening groove which is formed in the housing core, wherein the housing core comprises a first housing-core part and a second housing-core part, wherein the fastening groove is arranged in a region between the first housing-core part and the second housing-core part, wherein the housing sleeve has an attachment region, which is in a form of a ring-shaped protuberance on the inner contour of the housing sleeve, and wherein the attachment region of the housing sleeve engages behind the first housing-core part and/or the second housing-core part.

6. The valve according to claim 4, wherein the housing core has a supply channel that extends transversely or perpendicularly to the longitudinal axis and which opens at a mouth into an intermediate space between the housing sleeve and the housing core, wherein the housing core has on a side of the mouth that is directed towards the cartridge connector opening a greater cross-sectional width or a greater diameter than on a side of the mouth that is directed away from the cartridge connector opening.

7. The valve according to claim 1, wherein the valve housing has a ring-shaped retaining element by which the valve is able to be fixed in a gas cartridge connector of a soda machine.

8. The valve according to claim 1, wherein an overpressure valve is arranged on the valve housing that is configured to allow an escape of overpressure prevailing in a region of the cartridge connector opening.

9. The valve according to claim 1, wherein the valve comprises a cartridge closure element that is preloaded into a closed position, in which the cartridge closure element closes off a passage between the at least one outlet opening and the cartridge connector opening, wherein the cartridge closure element is movable by an activating element of the valve in a direction of an open position, in which the passage between the at least one outlet opening and the cartridge connector opening is opened for discharging the gas.

10. The valve according to claim 1, wherein on a side opposite the cartridge connector housing, the valve housing has a filling opening via which the gas can flow into the valve in the direction of the longitudinal axis, wherein the filling opening is arranged between an outer contour of the actuation element and an inner contour of the valve housing, wherein the filling opening is a ring-shaped form.

11. The valve according to claim 10, wherein the valve comprises an inlet closure element that is preloaded by a spring element into a closed position in which the inlet closure element closes off a passage between the filling opening and the cartridge connector opening or closes the filling opening, wherein the spring element is configured such that by application of a predefined gas pressure at the filling opening, the inlet closure element is able to be moved to an open position in which the passage between the filling opening and the cartridge connector opening, or the filling opening, is opened for inducting the gas.

12. The gas cartridge for connecting to a gas cartridge connector of a soda machine, having the valve as claimed in claim 1.

13. A method for filling the gas cartridge as claimed in claim 12, wherein on a side situated opposite the cartridge connector opening, the valve housing has a filling opening by way of which the gas is inducted into the valve in the direction of the longitudinal axis.

14. The method according to claim 13, wherein the valve has an inlet closure element that is preloaded by a spring element into a closed position in which the inlet closure element closes off the filling opening, wherein a predefined gas pressure is applied at the filling opening in order to bring the inlet closure element into an open position.

15. The method according to claim 13, wherein a fluid connection between the at least one outlet opening and the environment is sealed off.

* * * * *